(12) United States Patent
Steele

(10) Patent No.: US 11,994,010 B2
(45) Date of Patent: May 28, 2024

(54) ISOLATION DEVICES AND FLOW CONTROL DEVICE TO CONTROL FLUID FLOW IN WELLBORE FOR GEOTHERMAL ENERGY TRANSFER

(71) Applicant: Halliburton Energy Services, Inc., Houston, TX (US)

(72) Inventor: David Joe Steele, Carrollton, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/489,236

(22) Filed: Sep. 29, 2021

(65) Prior Publication Data

US 2023/0101922 A1 Mar. 30, 2023

(51) Int. Cl.
*E21B 43/12* (2006.01)
*F03G 4/00* (2006.01)

(52) U.S. Cl.
CPC ............ *E21B 43/12* (2013.01); *F03G 4/00* (2021.08)

(58) Field of Classification Search
CPC .................................. E21B 43/12; F03G 4/00
USPC ....................................................... 166/305.1
See application file for complete search history.

(56) References Cited

U.S. PATENT DOCUMENTS

| | | | |
|---|---|---|---|
| 6,490,916 B1 | 12/2002 | Goodwin et al. | |
| 7,032,675 B2 | 4/2006 | Steele et al. | |
| 7,866,400 B2 | 1/2011 | Steele et al. | |
| 8,096,362 B2 | 1/2012 | Steele et al. | |
| 8,910,714 B2 | 12/2014 | Tardy et al. | |
| 8,991,510 B2 | 3/2015 | Saar et al. | |
| 10,256,397 B2 | 4/2019 | Annunziata et al. | |
| 2002/0121372 A1* | 9/2002 | Cook | ............... E21B 43/108 166/250.15 |
| 2007/0017677 A1 | 1/2007 | Steele et al. | |
| 2007/0284118 A1 | 12/2007 | Benton | |
| 2010/0307756 A1 | 12/2010 | Jung et al. | |
| 2011/0061875 A1 | 3/2011 | Tips et al. | |
| 2011/0073295 A1 | 3/2011 | Steele et al. | |

(Continued)

FOREIGN PATENT DOCUMENTS

| | | | |
|---|---|---|---|
| CN | 104453815 A | | 3/2015 |
| KR | 1020130134250 | * | 12/2013 |
| KR | 1020130134250 A | | 12/2013 |

OTHER PUBLICATIONS

International Application, International Search Report and Written Opinion, PCT/US2021/052660, dated Jun. 16, 2022, 12 pages.

(Continued)

*Primary Examiner* — Matthew R Buck
*Assistant Examiner* — Patrick F Lambe
(74) *Attorney, Agent, or Firm* — Kilpatrick Townsend & Stockton LLP

(57) ABSTRACT

A system can include isolation devices, a flow control device, and an energy transfer device. The isolation devices can be positioned between a wall of a wellbore and a tubular positioned in the wellbore for carrying fluid for geothermal energy transfer. The flow control device can be positioned in the wellbore and between the isolation devices for controlling flow of the fluid between zones of the wellbore for transferring geothermal energy to a surface of the wellbore. The energy transfer device can be positioned at the surface of the wellbore for transferring the geothermal energy from the fluid into usable energy.

20 Claims, 9 Drawing Sheets

(56) References Cited

U.S. PATENT DOCUMENTS

| | | | | |
|---|---|---|---|---|
| 2012/0061093 | A1* | 3/2012 | Garcia | E21B 43/12 |
| | | | | 166/373 |
| 2012/0160496 | A1 | 6/2012 | Tardy et al. | |
| 2017/0130703 | A1 | 5/2017 | Muir et al. | |
| 2017/0247990 | A1 | 8/2017 | Bahorich | |
| 2017/0321934 | A1* | 11/2017 | Krüger | E21B 47/06 |

OTHER PUBLICATIONS

Banerjee et al., "Design of Flow Control Devices in Steam-Assisted Gravity Drainage Completion", J Petrol Explor Prod Technol, vol. 8, 2018, pp. 785-797.

Geothermal Communities, "Geothermal Systems and Technology—Chemistry of Thermal Fluids", available at https://geothermalcommunities.eu/assets/elearning/3.2.Corrosion&Scalling.pdf at least as early as Jul. 15, 2021, pp. 36-47.

Geothermal Technologies Office, "What is an Enhanced Geothermal System (EGS)?", Brochure available https://www.energy.gov/sites/prod/files/2016/05/f31/EGS%20Fact%20Sheet%20May%202016.pdf, May 2016, 2 pages.

Hogarth et al., "Flow Performance of the habanero EGS Closed Loop", Proceedings World Geothermal Congress, Melbourne, Australia, Apr. 19-25, 2015, 9 pages.

Houser, "Performance of Eleven Ti Alloys in High Temperature, High Pressure Brine Solution", Proceedings World Geothermal Congress, Bali, Indonesia, 5 pages, Apr. 25-29, 2010.

Kaya et al., "Corrosion and Material Selection for Geothermal Systems", Proceedings World Geothermal Congress, Antalya, Turkey, Apr. 24-29, 2005, 5 pages.

Pogacnik et al., "CGS—Controlled Wellbore-to-Wellbore Geothermal System Flow", Proceedings, Thirty-Eighth Workshop on Geothermal Reservoir Engineering, Stanford University, Stanford, California, Feb. 11-13, 2013, 14 pages.

Polsky et al., "Enhanced Geothermal Systems (EGS) Well Construction Technology Evaluation Report", available at https://www1.eere.energy.gov/geothermal/pdfs/egs_well_contruction.pdf, Dec. 2008, 108 pages.

Schlumberger, "Side Pocket Mandrels", Product Sheet available at https://www.slb.com/completions/artificial-lift/gas-lift/side-pocket-mandrels, 2017, 2 pages.

Stalder, "Test of SAGD Flow Distribution Control Liner System, Surmont Field, Alberta, Canada", J Can Pet Technoly, vol. 52, doi: https://doi.org/10.2118/153706-PA, 2013, pp. 95-100.

ThinkGeoEnergy, "An Overview of Geothermal Resources", available at https://www.thinkgeoenergy.com/geothermal/an-overview-of-geothermal-resources/ at least as early as Jul. 15, 2021, 7 pages.

Thorbjornsson et al., "Materials for Geothermal Steam Utilization at Higher Temperatures and Pressure", Proceedings World Geothermal Congress, Melbourne, Australia, 7 pages, Apr. 19-25, 2015.

TMK-Group, "Vacuum Insulated Tubing", available at https://www.tmk-group.com/VIT, 2015, 10 pages.

Vachon et al., "Use of Flow Control Devices (FCDs) to Enforce Conformance in Steam Assisted Gravity Drainage (SAGD) Completions", Paper presented at the SPE Canada Heavy Oil Technical Conference, Calgary, Alberta, Canada, Jun. 2015, 16 pages.

VALLOUREC, "Tube-Alloy Vacuum Insulated Tubing,", Brochure available at https://solutions.vallourec.com/-/media/Solutions-img/Oil-and-Gas/Documents-and-Resources/OCTG/Accessories-and-special-products/Brochure_THERMOCASE.ashx, Oct. 2014, 6 pages.

Wikipedia, "Enhanced geothermal system", available on the internet at https://en.wikipedia.org/wiki/Enhanced_geothermal_system at least as early as Jan. 14, 2018, 18 pages.

* cited by examiner

ISOLATION DEVICES AND FLOW CONTROL DEVICE TO CONTROL FLUID FLOW IN WELLBORE FOR GEOTHERMAL ENERGY TRANSFER

TECHNICAL FIELD

The present disclosure relates generally to geothermal energy transfer and, more particularly (although not necessarily exclusively), to isolation devices and flow control device in a wellbore to control fluid flow for geothermal energy transfer.

BACKGROUND

Subterranean formations can include one or more geothermal formations. The geothermal formations can include components, such as fluid, gas, rock, and the like, that can store or convey geothermal energy. Some geothermal energy transfer systems can use fluid to absorb geothermal energy from the geothermal formation. But, these geothermal energy transfer systems may not be able to access some of the geothermal energy of the geothermal formation. For example, geothermal energy from dry sources, such as rock within the geothermal formation, may not be accessible to these geothermal energy transfer systems. Additionally, these geothermal energy transfer systems may not be able to control fluid flow with respect to the geothermal formation to optimize one or more efficiencies of energy transfer.

DETAILED DESCRIPTION

Figure 1:
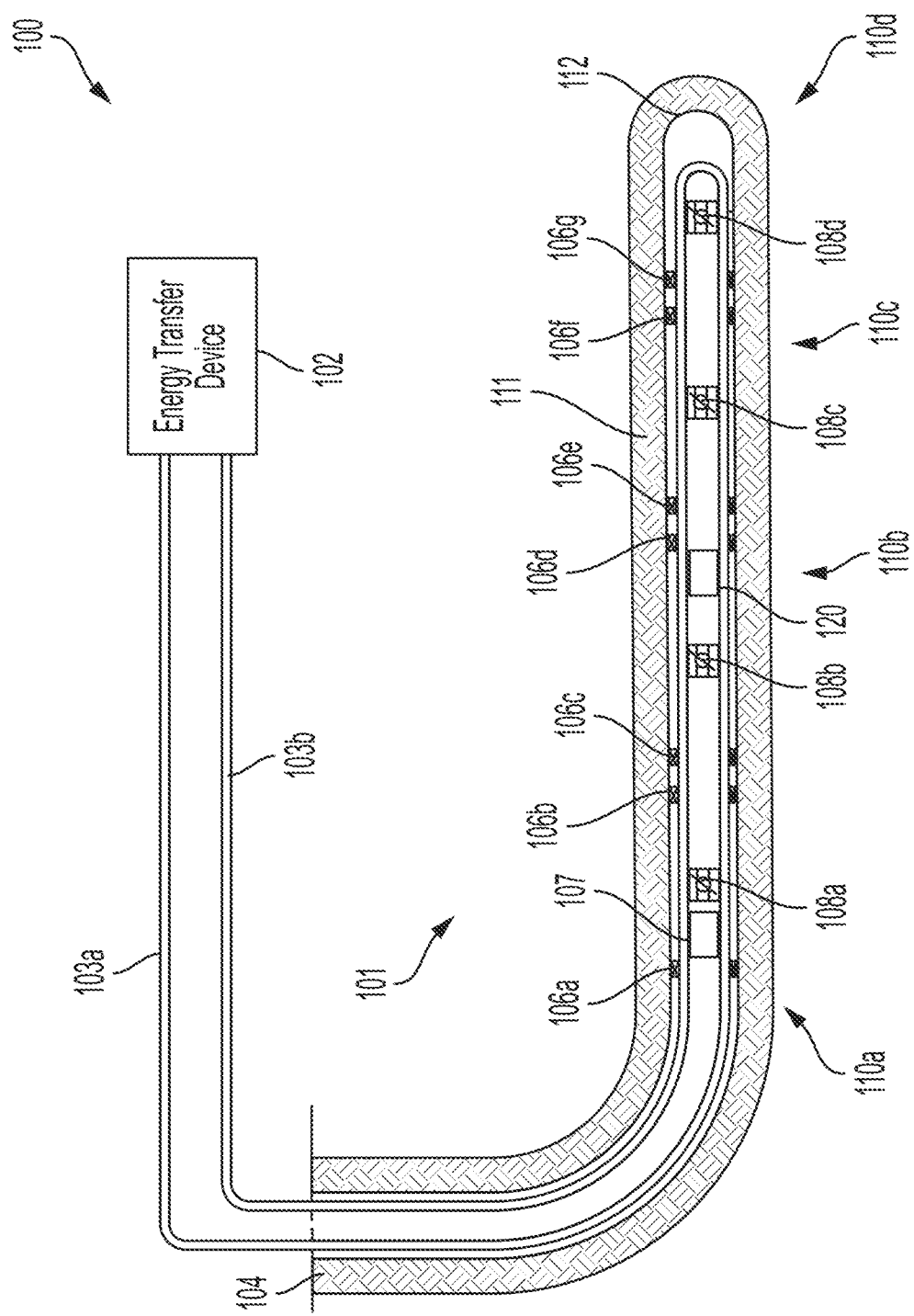
FIG. 1 is a schematic of a geothermal energy transfer system that includes isolation devices and a flow control device to control fluid flow in the system according to one example of the present disclosure.

Certain aspects and examples of the present disclosure relate to isolation devices and one or more flow control devices that can be used to control fluid flow in a wellbore for geothermal energy transfer. The isolation devices and the flow control devices can be included in a geothermal energy transfer system that can absorb geothermal energy from a geothermal formation and generate usable energy using the geothermal energy. In some examples, the isolation devices, such as packers or other suitable isolation devices, can be positioned between a wall of the wellbore and a casing of the wellbore. The isolation devices can define or otherwise form isolated zones in the wellbore. The isolated zones can be characterized by different temperatures, different permeabilities, different heat transfer coefficients, etc. The flow control device, such as a thermostatically controlled device, or an autonomous flow control device, can be positioned in the wellbore and between the isolation devices. The flow control device can control fluid flow between the isolated zones of the wellbore. For example, the flow control device can direct the fluid to a maximum temperature zone of the wellbore. The fluid can absorb geothermal energy and can be returned to a surface of the wellbore via a tubular of the wellbore. An energy transfer device can use the fluid to transfer the geothermal energy into usable energy such as electrical energy, mechanical energy, or other, suitable usable energy. In some examples, an energy transfer device can use the fluid as a thermal energy source. The thermal energy of the fluid may be transferred directly from the fluid or may be utilized via one or more devices such as a heat exchanger.

A naturally occurring geothermal system, known as a hydrothermal system, can be defined by three elements: heat, fluid, and permeability at depth. An Enhanced Geothermal System (EGS) can include an artificial reservoir, created where there is hot rock but insufficient or little natural permeability or fluid saturation. In an EGS, fluid can be injected into the subsurface under carefully controlled conditions, which can cause pre-existing fractures to re-open, creating or increasing permeability. Increased permeability can allow fluid to circulate throughout the now-fractured rock and to transport heat to the surface where electricity or other usable energy can be generated. Creating an enhanced, or engineered, geothermal system can involve improving natural permeability of rock. Rock can be permeable due to minute fractures and pore spaces between mineral grains. Injected water can be heated by contact with the rock and can return to the surface through production wells (e.g., similar to naturally occurring hydrothermal systems). EGS can include reservoirs created to improve the economics of resources without adequate water, permeability, or a combination thereof.

In an EGS, fluid can be injected into the subsurface where heat can be transferred into the fluid. The fluid can be flowed or pumped back to the surface through the same wellbore that it was injected in or through one or more other wellbores. While EGS systems and naturally occurring geothermal system can include separate systems, EGS systems can also be applied in conventional geothermal settings. Stimulation can allow hydrothermal reservoirs to be more productive by increasing permeability and, thereby, increasing output to the surface.

Geothermal development can additionally include advanced geothermal systems (AGS). AGS can extract thermal energy by utilizing a closed-loop system. For example, AGS can circulate a working fluid through a long wellbore that conducts heat from the rock surrounding the well. Another approach to utilize geothermal energy can involve supercritical geothermal systems (SGS). SGS can tap into super-high temperature geothermal strata with temperatures of, for example, 400° C. (750° F.) or greater. The reservoir fluid can be in a supercritical state since temperatures and pressures are much higher compared to the temperature and pressure of the reservoir fluid.

In some examples, lower-temperature geothermal wells may be economically viable due to a shallower depth, compared to high-temperature geothermal wells, and less corrosive elements or environments. In lower-temperature reservoirs, and some of the previously mentioned systems, the temperatures may not be sufficiently high enough to create steam for geothermal energy transfer, but the heat may be used for other applications that utilize heat. For example, the heat may be used for heating greenhouses, heating swimming pools, food processing, etc. Geothermal energy and the formations from which the geothermal energy is extracted may not be uniform. In a given area, the amount of thermal energy available for extraction may vary due to differences in geology, differences in permeability, presences or absences of fractures (natural, artificial, or a combination thereof), etc.

In some examples, a geothermal energy transfer system can generate electricity, or other usable energy, using geothermal energy. Other systems that generate electricity, or other usable energy, using geothermal energy may rely on resources where naturally occurring heat, water, and rock permeability are sufficient to allow energy extraction. But, some available geothermal energy may be located within dry or otherwise impermeable rock not accessible by the other systems. A geothermal energy transfer system according to some examples can access the geothermal energy within the impermeable rock using hydraulic stimulation such as by injecting fluid, such as thermal transport fluid, into a geothermal formation that includes impermeable rock. Injecting fluid can include forcing gas, liquid, or a combination thereof into a geothermal formation. Additionally or alternatively, injecting fluid can involve forcing the fluid into the formation to expand micro-fractures in the formation without destructively fracturing rock of the formation. Injecting fluid can additionally or alternatively include circulating the fluid in a wellbore formed proximate to the geothermal formation.

Geothermal power, which can include usable energy transferred from geothermal energy, can be generated using geothermal systems that exploit hot and deep geothermal resources. Fluid can be injected or otherwise positioned in a wellbore that is formed in a geothermal formation and can absorb geothermal energy for transferring the geothermal energy to the surface of the well. Drilling improvements or other suitable improvements with respect to the wellbore structure can increase an amount of geothermal power that can be produced. Additionally or alternatively, wellbore formation costs can be reduced, materials used to form the wellbore can be improved, completions with respect to the wellbore can be improved, etc.

In some examples, one or more geothermal energy transfer systems, similar to steam assisted gravity drainage wells, and associated processes or techniques can be used to improve recovery of thermal energy from the geothermal formation. The geothermal energy transfer systems can include a closed-loop system, an open-loop system, or a combination thereof. In some examples, fluid of the geothermal energy transfer systems can be confined in one or more zones of a casing of a wellbore, tubing of the wellbore, casing-tubing annulus, casing-wellbore annulus, or openhole section of the wellbore. The closed-loop system may not rely on fluid exchange outside of the closed-loop system and can involve injecting the fluid into a zone of a wellbore of the closed-loop system, allowing the fluid to absorb geothermal energy from the geothermal formation, and extracting the fluid from the wellbore for generating usable energy. The open-loop system can encourage fluid exchange with the geothermal formation and can involve injecting the fluid into a first wellbore and injecting the fluid from the first wellbore into one or more zones of the geothermal formation or other suitable locations such as the tubing-casing annulus, the casing-wellbore annulus, etc. A second wellbore can extract the fluid subsequent to the fluid absorbing geothermal energy from the geothermal formation. The extracted fluid can be returned to the surface for transferring the absorbed geothermal energy into usable energy.

The geothermal energy transfer systems can include a combination system that can include a combination of components from the closed-loop system and the open-loop system, other suitable components, or a combination thereof. The combination system can selectively perform operations associated with a combination of the open-loop system and the closed-loop system. For example, the combination can inject a first fluid into the first wellbore, can allow the first fluid to absorb the geothermal energy, and can extract the first fluid from the first wellbore. Subsequently, a temperature of the geothermal formation may be reduced, and the combination system can switch to an open-loop configuration in which the combination system can inject a second fluid into the first wellbore and into the geothermal formation to allow the second fluid to absorb a maximum, or otherwise optimum, amount of geothermal energy. In some examples, the system can extract the second fluid from the geothermal formation using the second wellbore and can return the second fluid to the surface. Upon extraction from the geothermal formation, the second fluid can include, in addition to the originally injected second fluid, fluid from the earth such as formation fluids, etc.

Fluid can be injected into a wellbore of the geothermal energy transfer systems that is formed within or otherwise proximate to the geothermal formation. The fluid can include water, gas, oil, or other suitable fluid that can facilitate geothermal energy transfer. In some examples, using the fluid with a maximum temperature or amount of geothermal energy can improve or otherwise optimize an efficiency, such as a thermal efficiency, of the geothermal energy transfer systems. In some examples, injecting the fluid into the wellbore of the geothermal energy transfer systems can involve injecting the fluid into a maximum temperature zone of the wellbore while avoiding injecting the fluid into lower temperature zones of the wellbore. In some examples, injecting the fluid into the wellbore of the geothermal energy transfer systems can involve injecting the fluid into a lower-than-maximum temperature zones of the wellbore to avoid dissolution, precipitation, substitution, other undesirable processes, or a combination thereof.

The geothermal energy transfer system can include the isolation devices, the flow control device, one or more actuators, and a set of valves. In some examples, the geothermal energy transfer system can include two isolation devices, one flow control device, one actuator, and two valves, but other amounts of isolation devices, flow control devices, actuators, and valves can be included in the geothermal energy transfer system. The geothermal energy transfer system can additionally or alternatively include other suitable components for transferring geothermal energy into usable energy via the energy transfer system. The isolation devices can include cementitious devices, titanium-including devices, nickel-including devices, silica-resisting devices, and the like. Additionally, the isolation devices can include devices with high temperature additives, devices with volcanic material additives, devices with carbon additives, devices including titanium, devices including nickel, etc.

The flow control device can include a thermostatically controlled device, an autonomous inflow control device, a non-autonomous inflow control device, a surface-controlled inflow control device, a channel-style control device, and the like. The flow control device can be controlled autonomously based at least on one or more temperature measurements from one or more sensors. For example, the flow control device can inject fluid into a zone of the geothermal formation based on a detected temperature of the zone. Additionally or alternatively, the flow control device can extract the fluid from the geothermal formation based on a detected temperature of the fluid. The flow control device can be operably coupled to the actuators. The actuators can actuate the flow control device in response to a predefined relationship being detected between a phase of the fluid and a pressure, temperature, or a combination thereof with respect to the flow control device.

In some examples, the geothermal energy transfer system can include a monitoring line, a control line, or a combination thereof. In some examples, the monitoring line can include a fiber optic cable. The monitoring line can be positioned in the wellbore and can be communicatively coupled to a computing device. The monitoring line can monitor or otherwise measure downhole conditions in the wellbore. For example, the monitoring line can monitor a temperature of the wellbore, a pressure of the wellbore, and the like. The control line can include an electrical cable or other suitable type of control line. The control line can be positioned downhole and electrically coupled to the flow control device, the computing device, and other suitable components. The control line can allow the computing device to autonomously control fluid flow in the wellbore via the flow control device. Alternatively, the control line can allow personnel of the system to control the flow of fluid in the wellbore.

The above illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a geothermal energy transfer system 100 that includes isolation devices and a flow control device to control fluid flow in the geothermal energy transfer system 100 according to one example of the present disclosure. The geothermal energy transfer system 100 can be disposed in, or otherwise include, a wellbore 101. The wellbore 101 can be formed in a geothermal formation, which can include sources of geothermal energy. In some examples, the geothermal energy can be included in rocks, fluid, or other components of the geothermal formation. The geothermal energy transfer system 100 can include an energy transfer device 102, and a set of tubulars 103a-b. The energy transfer device 102 can be positioned at a surface 104 of the wellbore 101 and can transfer geothermal energy into usable energy such as electrical energy, mechanical energy, or other suitable types of usable energy. In some examples, the energy transfer device 102 can include a steam generator or other suitable type of energy generator.

The tubulars 103a-b can be positioned in the wellbore 101 and can be mechanically coupled to the energy transfer device 102. The tubular 103a can be an injection path in which fluid, such as thermal transfer fluid, can be injected into the wellbore 101 to allow the fluid to absorb geothermal energy from the geothermal formation. The tubular 103b can be a return path in which the fluid can be produced, or otherwise returned, from the wellbore 101. The produced fluid can be directed to the energy transfer device 102, which can generate usable energy using the geothermal energy absorbed by the fluid.

The geothermal energy transfer system 100 can include seven isolation devices 106a-g and a flow control device 107. The geothermal energy transfer system 100 can include other suitable amounts of isolation devices 106 and flow control devices 107 for controlling fluid flow in the geothermal energy transfer system 100. The isolation devices 106 and the flow control device 107 can be positioned in the wellbore 101. The isolation devices 106 can be positioned in the wellbore 101 to create or otherwise form a set of zones 110a-d in the reservoir. For example, the isolation devices 106 can be positioned between a casing of the wellbore 101 and a wall 111 of the wellbore 101. The isolation devices 106 can additionally be positioned between the tubulars 103 and the casing of the wellbore 101. The isolation devices 106 can be positioned in other suitable locations with respect to the wellbore 101 for creating or forming isolated zones 110 in the wellbore 101.

The geothermal energy transfer system 100 can additionally include at least one sensor 120. The sensor 120 can be positioned in the wellbore 101 and can be communicatively coupled to the flow control device 107. The sensor 120 can detect pressure, temperature, and other suitable measurements relating to the fluid. The flow control device 107 can use the measurements received from the sensor 120 to control the fluid.

The set of zones can include one or more zones. Each zone of the set of zones can be characterized by a different size or shape. In some examples, each zone can be similar or identical in size or shape. The shape or size of a zone can be changed. For example, two or more zones can be combined to form a larger zone. Additionally, heat exchange can be enhanced within one or more zones by increasing a surface area of the heat exchange. For example, a heat exchange device, such as a steel fin tube, axial fins, a double-pipe heat exchanger, spirally fluted tubes, etc., can be positioned in one or more zones to increase, or otherwise optimize, an amount of heat transfer.

As illustrated, the isolation devices 106 form four zones 110a-d in the wellbore 101: zone 110a between isolation devices 106a-b, zone 110d between isolation device 106g and a bottom 112 of the wellbore 101, etc. The isolation devices 106 can form other suitable amounts of zones 110 in the wellbore 101 for controlling fluid flow in the geothermal energy transfer system 100. Each zone 110 can be characterized by a different temperature or level of available geothermal energy. For example, the zone 110d can be characterized by a maximum temperature or available geothermal energy, and the zone 110c can be characterized by a minimum temperature or available geothermal energy, etc. The geothermal energy transfer system 100 can direct the fluid, in this example, to the zone 110d to allow the fluid to absorb a maximum amount of geothermal energy for transferring the geothermal energy into usable energy.

The flow control device 107 can be positioned in the wellbore 101 and between the isolation devices 106 to control flow of the fluid in the wellbore 101. For example, the flow control device 107 can be positioned between the isolation devices 106a and 106b and can control whether fluid is directed to zone 110a, zone 110b, etc. In some examples, the flow control device 107 can be positioned between other suitable isolation devices 106. In other examples, the geothermal energy transfer system 100 can include a set of flow control devices 107 that can be positioned between one or more pairs of isolation devices 106. The flow control device 107 can include a thermostatically controlled flow control device or an autonomous flow control device. The autonomous flow control device can include a hybrid autonomous flow control device, a fluidic diode, a rate-control valve, a PT (pressure-temperature) flow control device, or other suitable type of flow control device 107.

The flow control device 107 can be controlled autonomously based on a phase of the fluid, a temperature of the fluid, a temperature of one or more zones 110 of the wellbore 101, the temperature and pressure (for determining critical fluids, etc.) of one or more zones 110 of the wellbore 101, or based on other suitable parameters. For example, the flow control device 107 can automatically direct fluid to a zone of the wellbore 101 based on a temperature of the zone. In some examples, the zone can be characterized by a maximum temperature compared to other zones in the wellbore 101. Additionally or alternatively, the flow control device 107 can be controlled by a computing device associated with the geothermal energy transfer system 100.

The geothermal energy transfer system 100 can additionally include a set of valves 108a-d that can be positioned between the isolation devices 106. For example, the valves 108 can be positioned in each zone 110 of the wellbore 101 (e.g., valve 108a can be positioned in zone 110a, valve 108b can be positioned in zone 110b, etc.). The valves 108 can be positioned in other suitable arrangements in the wellbore 101. The valves 108 can allow fluid to flow from the injection path tubular 103a to the return path tubular 103b. The flow control device 107 can control the valves 108. For example, the flow control device 107 can direct fluid to a zone of maximum temperature, such as the zone 110b, can allow the fluid to absorb geothermal energy, and can actuate the valve 108b for causing the fluid to be directed to the tubular 103b for being returned to the surface 104.

In some examples, the geothermal energy transfer system 100 can be used with respect to a fractured geothermal formation. For example, the wellbore 101 can be formed in a fractured geothermal formation that includes one or more fractures. The fractures can be naturally occurring, can be hydraulically (or otherwise artificially) induced fractures, or a combination thereof. Fluid can be injected into the wellbore 101, and the flow control device 107 can cause the fluid to be injected into the fractured geothermal formation. The fluid can travel through the fractured geothermal formation for absorbing a greater amount of geothermal energy compared to an amount of geothermal energy absorbed while the fluid is in the wellbore 101. The fluid can subsequently be produced or extracted into the wellbore 101 and can be returned to the surface 104 for transferring the absorbed geothermal energy into usable energy. The fluid may be produced or extracted into the wellbore 101 from one or more zones (e.g. 110a, 110b, etc.) depending upon the zone with the highest temperature or other desirable parameter.

Figure 2:
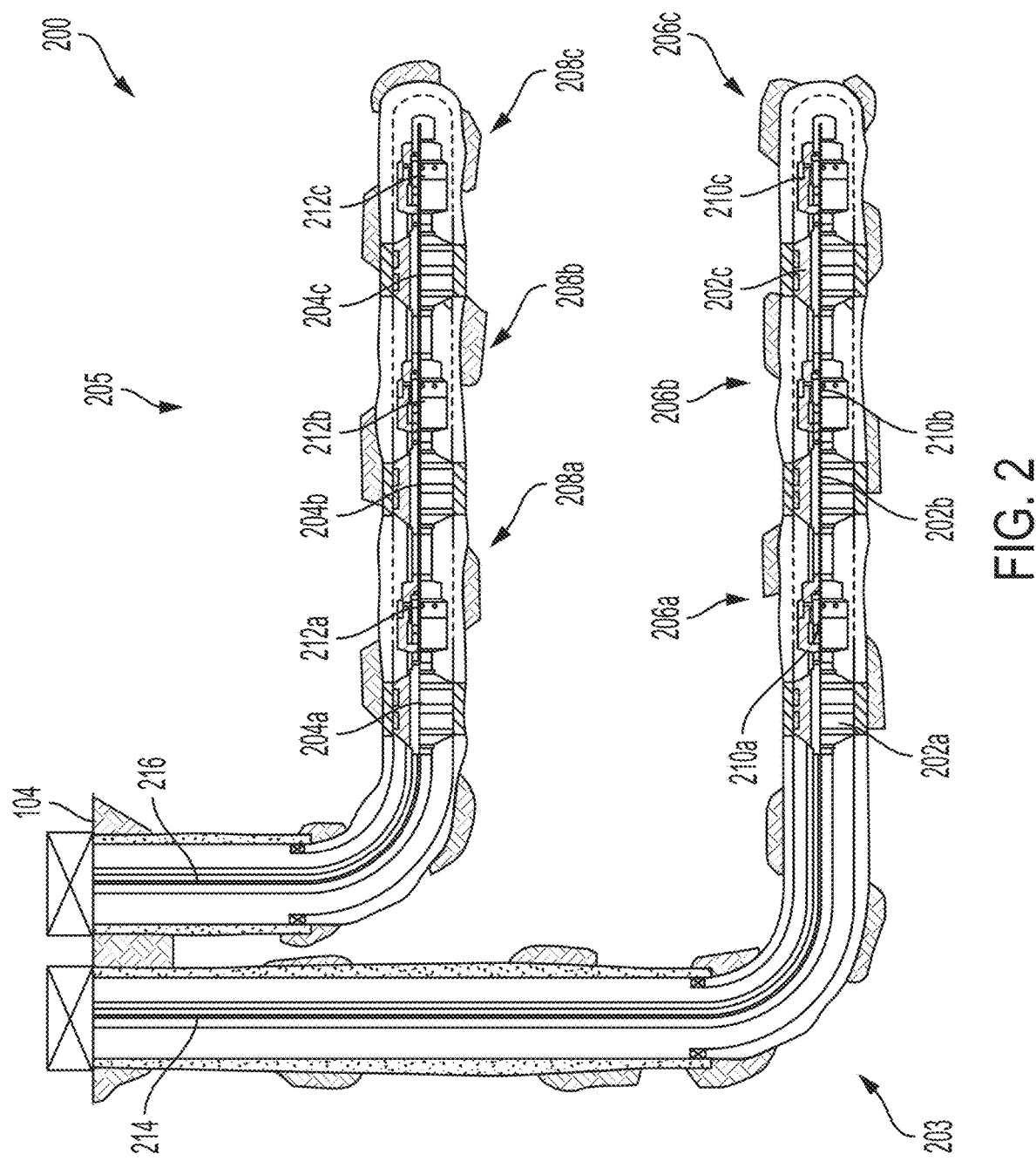
FIG. 2 is a schematic of an open-loop geothermal energy transfer system according to one example of the present disclosure.

FIG. 2 is a schematic of an open-loop geothermal energy transfer system 200 according to one example of the present disclosure. The open-loop system 200 can include two sets of isolation devices and two sets of flow control devices. A first set of isolation devices can include isolation devices 202a-c, which can be positioned in a first wellbore 203 formed in a geothermal formation. The second set of isolation devices can include isolation devices 204a-c, which can be positioned in a second wellbore 205 formed in the geothermal formation. The first isolation devices can define a first set of isolated zones 206a-c in the first wellbore 203, and the second isolation devices can define a second set of isolated zones 208a-c in the second wellbore 205. The first set of isolated zones 206a-c can connect, for example via fluid, with the second set of isolated zones 208a-c.

In some examples, the isolated zones 206 and the isolated zones 208 can be characterized by different shapes, sizes, or a combination thereof. Alternatively, the isolated zones 206 and 208 can be similar or identical in shape or size. Each zone of the isolated zones 206 or 208 may be isolated from other zones of the isolated zones 206 or 208. In other examples the isolated zones 206 or 208 can be in thermal (or other suitable) communication with one another (e.g., the zones can mix and can be partially isolated).

The isolated zones 206 and 208 can be characterized by a type of geothermal system. For example, the isolated zones 206 and 208 can be zones of a natural geothermal well, an EGS well, an AGS well, an SGS well, other suitable type of geothermal well, or a combination thereof. The isolated zones 206 and 208 can be converted between types of geothermal well zones. For example, the isolated zones 206 and 208 may be converted from a natural geothermal well zone to an EGS well zone. Other combinations of conversions are possible. In other examples, each zone of the isolated zones 206 and 208 may be characterized by a different type of well zone. For example, the isolated zone 206a may be a natural geothermal well zone, and the isolated zone 206c may be an EGS well zone. Each zone can individually be converted between types of well zones without converting the entire well. To control heat transfer and an amount of geothermal energy produced from the well, the isolated zones 206 and 208 can be converted, combined, or otherwise suitably changed. For example, isolated zones 206a and 208a can be combined to improve or otherwise optimize thermal properties of the well. Combined zones can be adjacent or non-adjacent.

As illustrated, the open-loop system 200 includes a first set of flow control devices and a second set of flow control devices. The first flow control devices can include flow control devices 210a-c, which can be positioned in the first wellbore 203 between the first isolation devices 202a-c. The second flow control devices can include flow control devices 212a-c, which can be positioned in the second wellbore 205 between the second isolation devices 204a-c. The first set of flow control devices and the second set of flow control devices can include other suitable amounts of flow control devices for controlling fluid flow in the first wellbore 203 and in the second wellbore 205. In one example, the first set of flow control devices, the second set of flow control devices, or a combination thereof, can include one flow control device.

The flow control devices 210 can control fluid flow in the first wellbore 203 and between the isolation devices 202. The flow control devices 212 can control fluid flow in the second wellbore 205 and between the isolation devices 204. Additionally, the flow control devices 210 can selectively inject fluid into the geothermal formation, and the flow control devices 212 can selectively extract fluid from the geothermal formation. For example, fluid can be injected into the first wellbore 203 via a tubular 214, which can be an injection path of the open-loop system 200. The fluid can be directed, by one or more of the flow control devices 210a-c, to a zone of the first wellbore 203 characterized by a maximum temperature with respect to the zones 206a-c of the first wellbore 203. The flow control device 210 associated with the zone can inject the fluid into the geothermal formation to allow a maximum or optimum amount of geothermal energy to be absorbed by the fluid.

The fluid can be selectively extracted from the geothermal formation. For example, one of the flow control devices 212 can allow the fluid to be extracted from the geothermal formation into the second wellbore 205. The flow control device 212 can allow fluid of maximum temperature compared to other fluid that can be produced from the geothermal formation to be produced. For example, a temperature of the fluid can be determined by the flow control device 212, by a computing device of the open-loop system 200, or by other suitable components of the open-loop system 200. And, if the temperature of the fluid is above a predetermined threshold, the flow control device 212 can actuate a valve to allow the fluid to be extracted from the geothermal formation.

The fluid can be extracted from the geothermal formation from any of the zones 208a-c, and the associated flow control device 212a-c can allow the fluid to be extracted from the corresponding zone 208. The flow control device 212 can subsequently direct the fluid into a tubular 216, which can be a return path that can allow the fluid to be returned to the surface 104 for transferring absorbed geothermal energy into usable energy. The tubular 216 can be insulated to reduce an amount of heat lost to the upper, cooler, formations. The tubular 216 may include insulating coating and an insulating fluid or solid between the tubular 216 and the casing and cement sheath that surrounds the tubular 216. In other examples, the tubular 216 may include a vacuum insulating device or process. For example, the tubular 216 may include vacuum insulated tubing (VIT), or other similar material, in examples such as when there may be a cold zone in the well. For example, if zone 208a begins to cool more quickly than zones 208b, 208c, or a combination thereof, VIT may be installed across zone 208a so that thermal energy is not lost to zone 208a as the thermal-energy laden fluid from zone 208b and 208c passes by to the surface. In other instances, a formation in the upper portion of the wellbore 205 may include water or an underground river. Either may have a high convective heat transfer coefficient and may attempt to cool the tubular 216. Providing a cement sheath with insulating properties, casing with insulating properties, a medium in the casing-tubing annulus with low heat transfer properties (or high insulating properties), insulated tubing, or a combination thereof, may increase an amount of thermal energy produced at the surface.

Alternatively, the flow control devices 212 can control fluid flow in the first wellbore 203 and between the isolation devices 202. In some examples, the permeability between zones 206 and zones 208 may be adequate so that flow control devices 212 can control fluid flow in the first wellbore 203 and between the isolation devices 204 into the second wellbore 205. The first wellbore 203 and the second wellbore 205 can be formed within a short amount of time with respect to each other (e.g., within days or weeks of each other). In other examples, the second wellbore 205 may be formed a long time (e.g., decades or longer) after the first wellbore 203.

In some examples, the flow control devices 210 and 212 may use one or more sensors to detect temperature, pressure, flow, mineral content, pH, other suitable downhole measurements, or a combination thereof. The flow control devices 210 and 212 may additionally use valves positioned in the wellbores 203 and 205, respectively, for controlling the flow of the fluid. For example, the flow control devices 210 can actuate one or more valves positioned in the wellbore 203 to allow fluid to be injected into the geothermal formation based on measurements received from the sensors. The sensors used by the flow control devices 210 and 212 may not be positioned proximate to the valves. For example, the sensors may be positioned on the flow control devices 210 and 212 or on one or more locations of the tubulars 214 and 216, while the valves may be positioned adjacent to walls of the wellbores 203 and 205 or on one or more locations of the tubulars 214 and 216 that are different that the one or more locations of the sensors.

In some examples, the open-loop system 200 can include an additional tubular, such as the tubular 216, in the first wellbore 203. In these examples, the open-loop system 200 can function as an open-loop system, as a closed-loop system, or as a combination system. The combination system can switch between, and perform functions of both, the open-loop system and the closed-loop system, in addition to other suitable functions. For example, the open-loop system 200 can include a third tubular that can be positioned in the first wellbore 203. The fluid can be injected into the wellbore 203 via the tubular 214, and various operations can be performed. For example, in an open-loop configuration, the flow control devices 210 can inject the fluid into the geothermal formation for absorbing geothermal energy and for being produced via the second wellbore 205. Additionally or alternatively, in a closed-loop configuration, the flow control devices 210 can direct the fluid to a maximum temperature zone of the wellbore 203 for absorbing geothermal energy, and the fluid can be produced via the third tubular of the wellbore 203. The open-loop system 200 can switch between the open-loop configuration and the closed-loop configuration. The tubular 216, and other components in this example may benefit from having insulation too.

Figure 3:
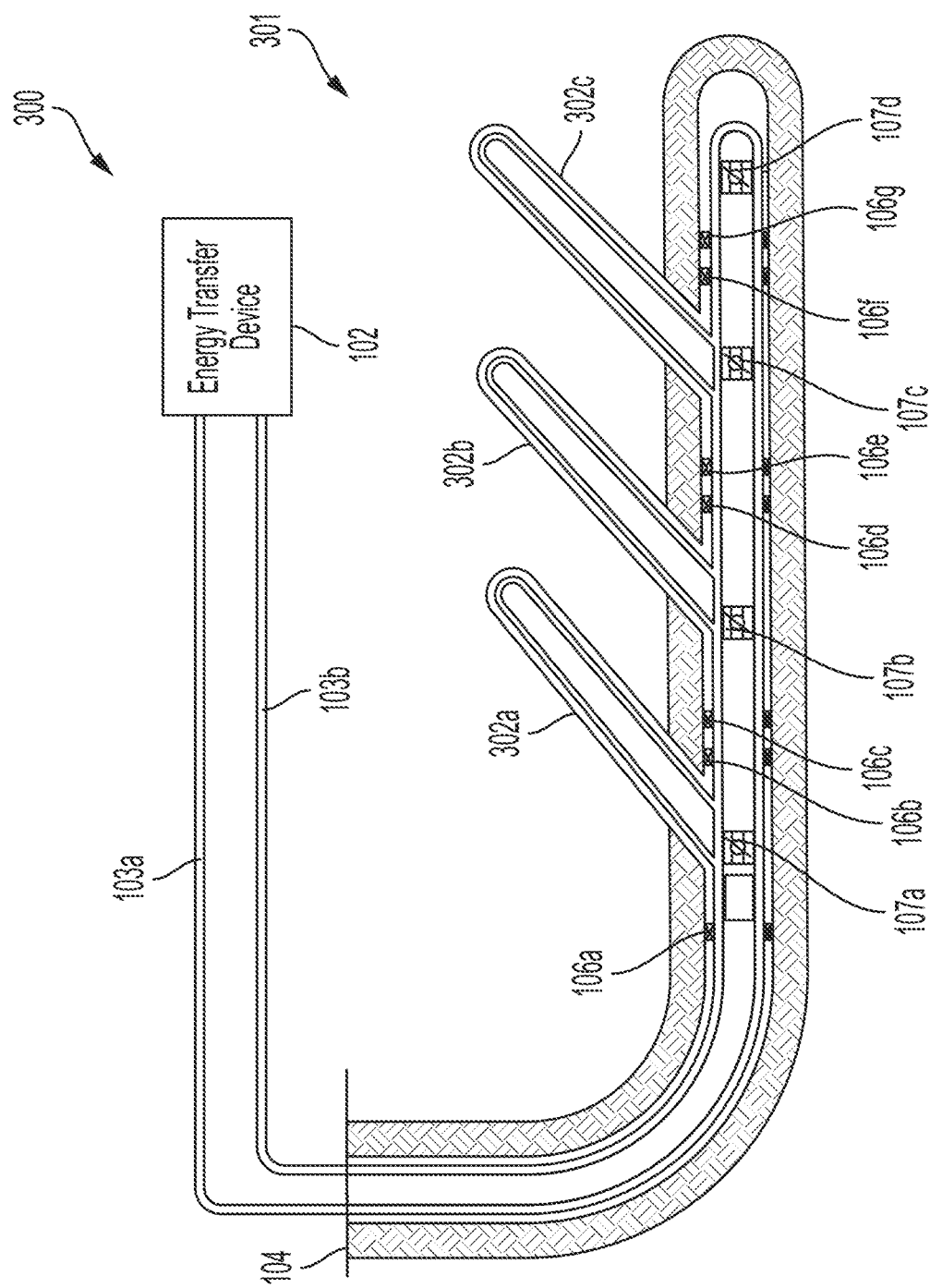
FIG. 3 is a schematic of a geothermal energy transfer system that can be used with respect to a wellbore with a set of lateral wellbores according to one example of the present disclosure.

FIG. 3 is a schematic of a geothermal energy transfer system 300 that can be used with respect to a wellbore 301 with a set of lateral wellbores 302a-c according to one example of the present disclosure. The wellbore 301 and the lateral wellbores 302 can be formed in a geothermal formation. The lateral wellbore 302 can be parallel to one another, can include U-tube lateral wellbores, or can include other suitable configurations of lateral wellbores 302. The geothermal energy transfer system 300 can be a closed-loop system in which fluid may not be injected into the geothermal formation, an open-loop system in which fluid can be injected into the geothermal formation, or a combination thereof. The geothermal energy transfer system 300 can include the energy transfer device 102, the tubulars 103a-b, the isolation devices 106a-g, and flow control devices 107a-d. In some examples, the flow control devices 107a-d can include temperature sensors that may be positioned at a suitable distance from the flow control devices 107a-d for detecting temperature of fluid or other suitable temperature measurements. Additionally, each flow control device 107a-d may include one or more sensors that can detect temperature, pressure, etc. The geothermal energy transfer system 300 can include other suitable components for transferring and maximizing the efficiency of transferring geothermal energy into usable energy. The flow control devices 107 can include valves for allowing fluid to be directed from an injection tubular, such as the tubular 103a, to a return tubular such as the tubular 103b. In some examples, the geothermal energy transfer system 300 can include one flow control device 107 and can include a set of valves, such as the valves 108a-d, that can be controlled by the flow control device 107 for directing fluid to a zone of optimum, such as maximum, temperature in the wellbore 301.

Fluid can be injected into the wellbore 301 via the tubular 103a. The flow control devices 107 can direct the fluid to a zone of maximum or otherwise optimum temperature in the wellbore 301 for allowing the fluid to absorb a maximum amount of geothermal energy. It should be noted that maximum temperature may be only one of many criteria to be used to determine which zone receives the most fluid or the quantity of fluid a zone receives. For example, if one zone is characterized by a slightly lower temperature but has a higher rate of heat transfer, it may be more desirable to inject more fluid in to the zone. In another example, a particular zone may have the highest temperature, but due to its high-temperature or high corrosive content, it may be desirable to not inject fluid into the zone (or at least until it cools down). In some examples, the zone of maximum temperature in the wellbore 301 can be in one of the lateral wellbores 302. For example, the lateral wellbore 302a can be characterized by a maximum temperature with respect to other portions of the geothermal energy transfer system 300. The flow control device 107a can direct the fluid to the lateral wellbore 302a to allow the fluid to absorb a maximum amount of geothermal energy. The fluid can return to the tubular 103b from the lateral wellbore 302a and can be produced or otherwise returned to the energy transfer device 102 for producing usable energy using the absorbed geothermal energy.

In some examples, the fluid can be injected into the geothermal formation from one or more of the lateral wellbores 302. For example, the flow control device 107a can direct the fluid into the lateral wellbore 302a. An area of maximum temperature may be located in the geothermal formation, and the fluid can be injected into the geothermal formation for absorbing a maximum amount of geothermal energy from the geothermal formation. The fluid can subsequently be extracted or otherwise produced from the geothermal formation via one or more of the lateral wellbores 302. For example, the fluid can travel through the geothermal formation and can be extracted into the lateral wellbore 302b or the lateral wellbore 302c, and the flow control device 107b or 107c, respectively, can direct the fluid into the tubular 103b for returning the fluid to the surface 104.

In some examples, a main wellbore may be drilled in a first direction and then lateral wellbores can be formed in subsequent directions to intersect natural fractures. For instance, the natural fractures may be intersected at a 90-degree angle with the lateral wellbores so the fluid can be injected into the lateral wellbore 302a, then the fluid may travel to lateral wellbore 302b or lateral wellbore 302c where the fluid may be returned to the energy transfer device 102 via the tubular 103b. In other examples, fluid may be injected into a tubular in lateral wellbore 302 and circulated back to the tubular 103b without coming in contact with the formation or fluids in the formation. Subsequently, as the temperature surrounding the lateral wellbore 302 drops (e.g. due to thermal energy being withdrawn, etc.), then the system can be switched over to an open-loop system. In this example, flow control devices 107, isolation devices 106, pressure and temperature sensors, the valve 108, other suitable components, or a combination thereof can be positioned in one or more of the lateral wellbores 302. In some examples, the use of side-pocket devices may be beneficial. For example, side-pocket mandrels may be installed with "dummy" valves that can protect the seal surfaces and mandrel from debris and corrosion. Subsequently (e.g., months or years later), a coiled tubing unit may be utilized to pull the "dummy" valves and install "real" valves. Likewise, side-pocket mandrels, or devices, may be utilized for installing flow control devices, sensors, and isolation devices. In some examples, a side-pocket mandrel of a valve may be pre-wired to be in communication (thermal communication, electrical communication, mechanical communication, or other energy-type of communication) with a side-pocket mandrel for a flow control device such that, as a valve and controller are installed, the valve and the controller can be ready to begin sending commands, receiving commands, or a combination thereof to or from one another. The energy may be provided by batteries carried down with the controller or valve. The energy may additionally or alternatively be provided by a pre-installed energy transfer line (electric line).

Figure 4:
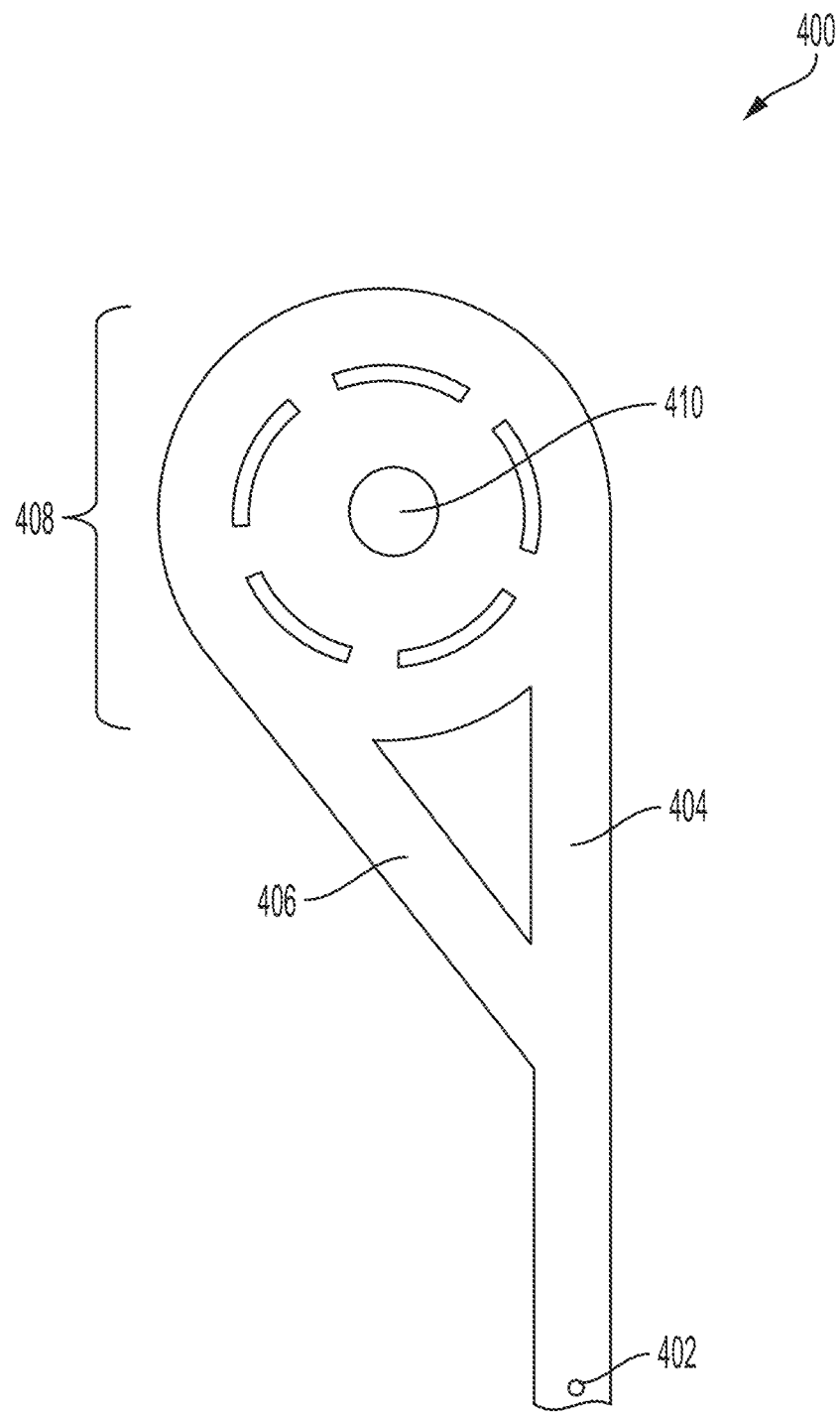
FIG. 4 is a schematic of a flow control device according to one example of the present disclosure.

FIG. 4 is a schematic of an autonomous inflow control device 400 according to one example of the present disclosure. The autonomous inflow control device 400 can be used as the flow control device 107 described with respect to FIG. 1. In some examples, the autonomous inflow control device 400 can be a fluidic diode flow control device. The autonomous inflow control device 400 can be or can include other suitable types of flow control devices for controlling flow of fluid in a geothermal energy transfer system. The autonomous inflow control device 400 may be responsive to one or more of: temperature, change in temperature, change in pressure, change in pH or/and other measurable parameter or combination thereof.

The autonomous inflow control device 400 can include an entrance 402 (which may be defined by an entrance housing), a first path 404, a second path 406, a vortex chamber 408, and an exit 410 (which may be defined by an exit housing). The entrance 402 can receive the fluid. For example, the entrance 402 can be mechanically coupled to a tubular, such as the tubular 103a, and fluid can be directed into the autonomous inflow control device 400 from the tubular. The entrance 402 can, in some examples, include a valve that can be selectively actuated for determining whether fluid is directed into the autonomous inflow control device 400. For example, the valve can be thermostatically actuated in which fluid that reaches a threshold temperature can cause the valve to be actuated for allowing the fluid to be directed into the autonomous inflow control device 400 via the entrance 402. The valve can additionally or alternatively be actuated (e.g., self-actuated or actuated by other suitable components) in other suitable manners. For example, the valve can discharge fluid (gas or liquid) based upon the temperature, the pressure, or a combination thereof of the fluid. Additionally, at the toe-end of the well, if the fluid being injected is still hot enough (i.e. hotter than the surrounding zone or formation) then the valve may allow or cause fluid exit. On the injection side, the valve may allow or cause fluid enter the return line if the fluid is above a predetermined temperature.

The first path 404 can allow fluid to be transported to the vortex chamber 408. Additionally, the second path 406 can allow fluid to be transported to the vortex chamber. In some examples, fluid transported via the first path 404 may be transported directly to the vortex chamber 408, while fluid transported via the second path 406 may be transported to the exit 410 through the vortex chamber 408. In other examples, fluid transported via the second path 406 may be transported directly to the vortex chamber 408, while fluid transported via the first path 404 may be transported to the exit 410 through the vortex chamber 408.

The vortex chamber 408 may create a vortex with fluid transported via the first path 404, the second path 406, or a combination thereof. The vortex chamber 408 can precisely control flow of the fluid by generating back pressure in the autonomous inflow control device 400. For example, the vortex chamber 408 can receive the fluid tangentially to create the vortex in which the fluid travels around the vortex chamber with large peripheral or tangential velocities. This can generate or otherwise form an air-filled core in the vortex chamber 408 that applies the back-pressure. The vortex chamber 408 can allow the autonomous inflow control device 400 to control flow of fluid through the exit. For example, the vortex chamber 408 can adjust the peripheral velocity of the fluid to adjust an amount of fluid that flows through the exit 410 of the autonomous inflow control device 400. The vortex chamber 408, or other components of the autonomous inflow control device 400, can perform other suitable operations for controlling fluid flow with respect to the flow control device 400.

Figure 5:
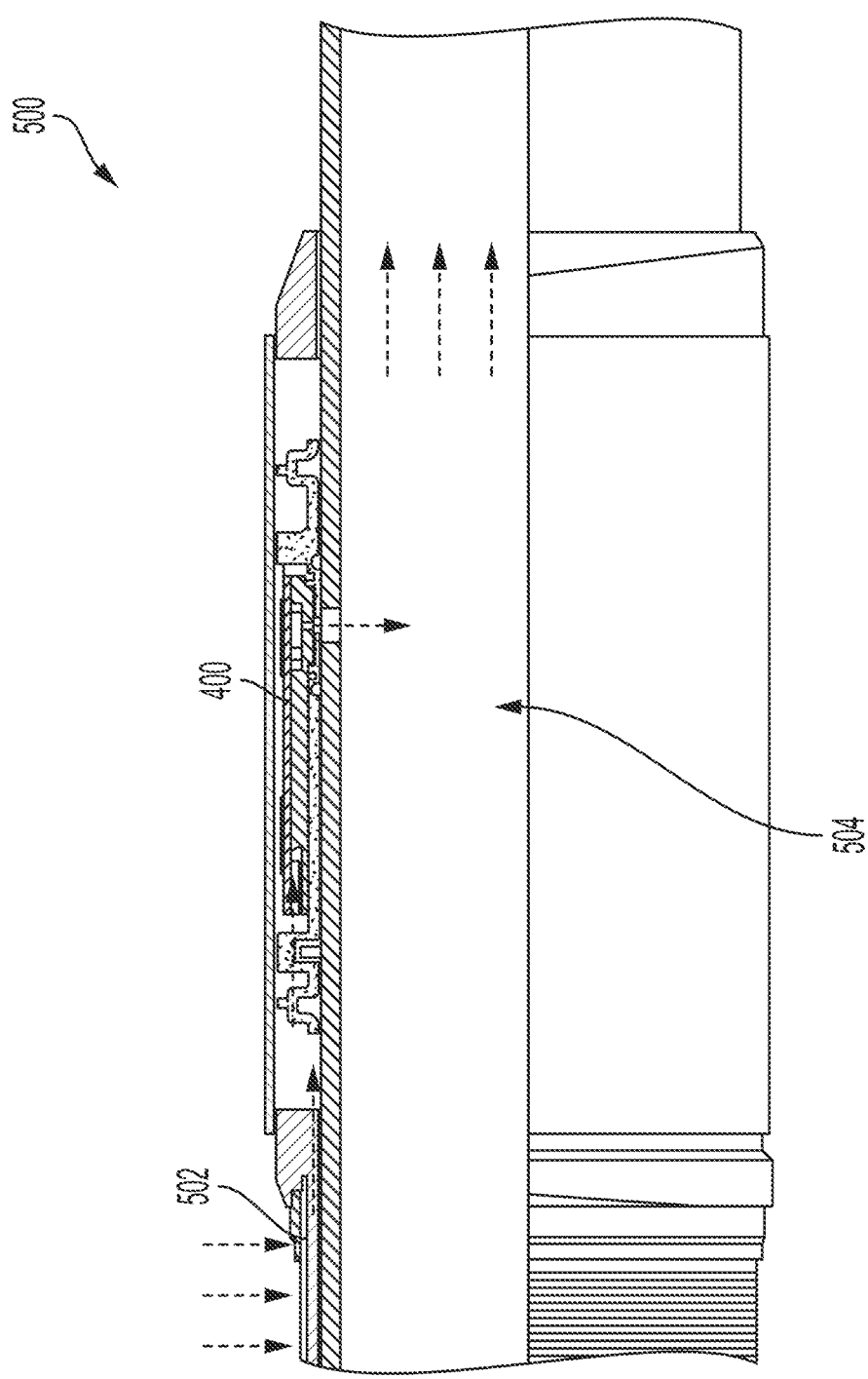
FIG. 5 is a sectional side-view of a tubular that includes a flow control device according to one example of the present disclosure.

FIG. 5 is a sectional side-view of a tubular 500 that includes a flow control device, such as autonomous inflow control device 400, according to one example of the present disclosure. The tubular 500 can be similar or identical to the tubulars 103a-b described with respect to FIG. 1. The tubular 500 can be included in a geothermal energy transfer system, such as the geothermal energy transfer system 100, the open-loop system 200, or other suitable geothermal energy transfer system. The tubular 500 can allow fluid to flow within the geothermal energy transfer system, for example between an energy transfer device 102 and a wellbore 101.

The autonomous inflow control device 400 can be or can include suitable types of flow control devices for controlling flow of fluid with respect to the tubular 500. The autonomous inflow control device 400 can be positioned on the tubular 500, adjacent to the tubular 500, in the tubular 500, for example embedded in a wall of the tubular 500, or in other suitable locations with respect to the tubular 500. The autonomous inflow control device 400 can receive fluid from the tubular 500, from a geothermal formation, or a combination thereof. The autonomous inflow control device 400 can direct the received fluid into the tubular 500. Additionally or alternatively, the autonomous inflow control device 400 can direct fluid from the tubular 500 to the geothermal formation.

As illustrated, fluid is directed into a wall 502, such as a side-pocket, of the tubular 500. The fluid can be directed into the autonomous inflow control device 400, and the autonomous inflow control device 400 can precisely control the flow of the fluid. For example, the autonomous inflow control device 400 can adjust a rate of fluid flow from the wall 502 of the tubular 500 into a center 504 of the tubular 500. Once directed into the tubular 500, the fluid can be returned to the surface 104 or transported to other suitable locations. In some examples, the autonomous inflow control device 400 can receive fluid from the tubular 500 and control a rate of fluid flow out of the tubular 500 such as injecting the fluid into the geothermal formation.

Figure 6:
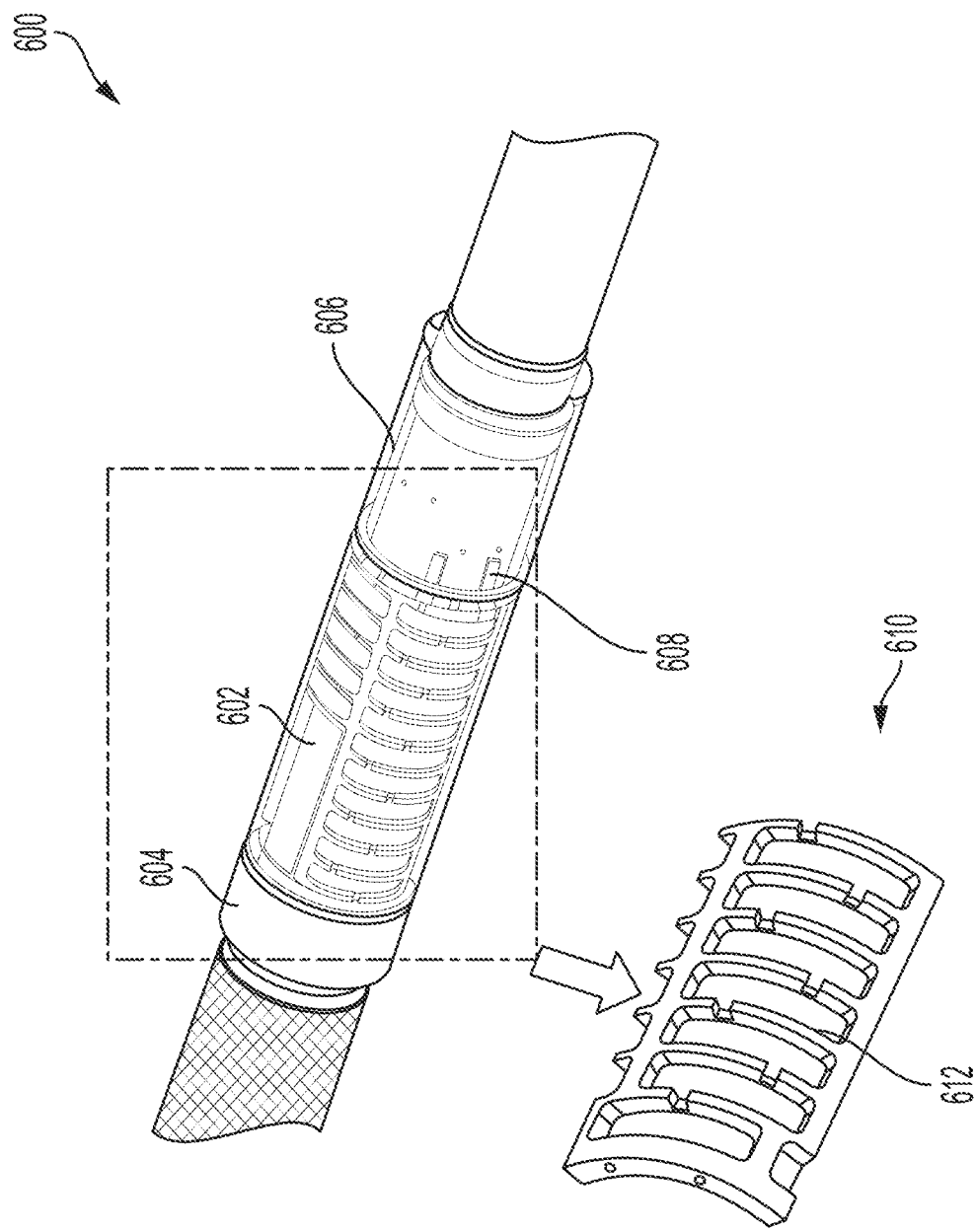
FIG. 6 is a perspective view of a tubular assembly that includes an isolation device according to one example of the present disclosure.

FIG. 6 is a perspective view of a tubular assembly 600 that includes an isolation device 602 according to one example of the present disclosure. The tubular assembly 600 can additionally include an adapter ring 604, a removable end cap 606, and removable plugs 608. The tubular assembly 600 can include other suitable components for allowing the isolation device 602 to be positioned with respect to the tubular assembly 600 for forming isolated zones in a wellbore of a geothermal energy transfer system. The adapter ring 604 and the removable end cap 606 can be sized for allowing the tubular assembly 600 to receive the isolation device 602, and the removable plugs 608 can, when positioned on the tubular assembly 600, be sized to prevent fluid flow with respect to the isolation device 602.

The isolation device 602 can be a hybrid isolation control device that can be positioned in a wellbore 101 and can form one or more isolated zones in the wellbore 101. The isolation device 602 can be or can include other suitable types of isolation devices for forming the isolated zones in the wellbore 101. The isolation device 602 can include a circumferential piece 610. The circumferential piece 610 can be defined by a set of pathways 612 that can facilitate the removal of condensate, debris, other undesirable material, or a combination thereof. In some examples, the circumferential piece 610 and the pathways 612 can represent a thermostatic steam trap to remove condensate from a fluid (e.g., a primarily gaseous fluid).

Fluid velocity within components such as a valve trim can be a primary source of system control problems such as cavitation, erosion, abrasion, vibration, and other similar problems. Thus, in some examples, the circumferential piece 610 and the pathways 612, other features, or a combination thereof, may form a number of right-angle turns to form one or more tortuous paths. The tortuous paths can achieve a pressure reduction while maintaining a reduced fluid velocity to prevent erosion, cavitation, etc.

Features, designs, techniques, coatings, and materials to address issues with cavitation, erosion, abrasion, and vibration may be incorporated with the valves, controllers, sensors, devices, etc. that have been presented herein without exceeding the scope of the present disclosure. The pathways 612 can include any suitable shape or pattern for facilitating formation of the isolated zones and minimizing issues including cavitation, erosion, abrasion, condensation creation or rejection, debris conglomeration and disposal, etc.

Figure 7:
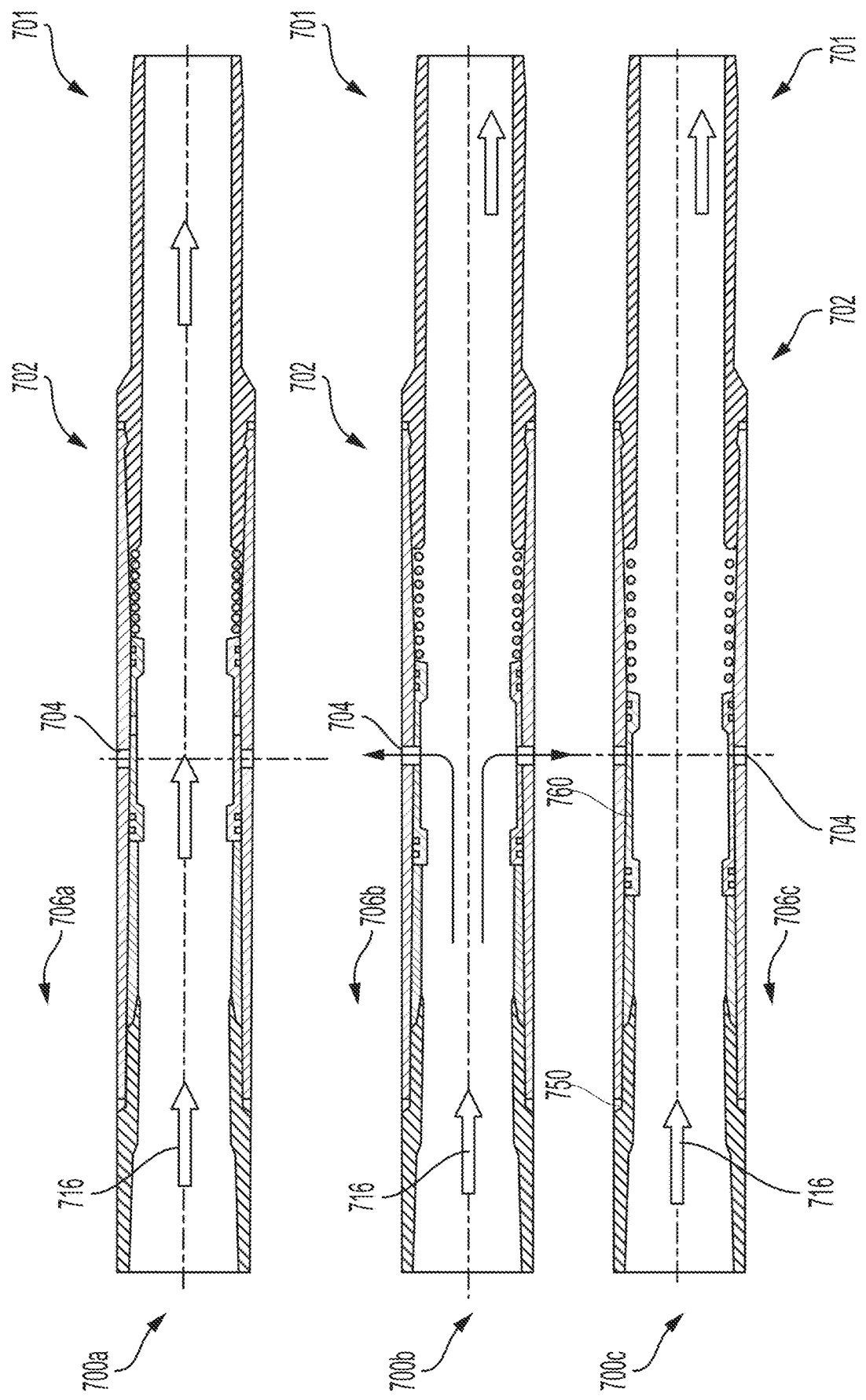
FIG. 7 is a set of sectional side-views of a tubular that includes a side-return line according to one example of the present disclosure.

FIG. 7 is a set of sectional side-views 700a-c of a valve 702 that can be utilized as shown in FIGS. 1-3 (valves 108a-d, flow control devices 210a-c, flow control devices 107a-d, etc.). The valve 702 can include a port 704 (e.g., for a side-return line or other similar component) according to one example of the present disclosure. In some examples, the port 704 can be actuated (e.g., opened or closed) using one or more components (e.g., actuators, springs, etc.) of the valve 702. The port 704 can be positioned, or otherwise disposed, in a wall of the valve 702. The port 704 can be positioned in other suitable locations with respect to the valve 702 in which the port 704 may not obstruct flow within the valve 702. In some examples, the valve 702 can be a side-pocket mandrel that can be used in a geothermal energy transfer system, such as the geothermal energy transfer system 100 described with respect to FIG. 1 or the open-loop system 200 described with respect to FIG. 2. The valve 702 can additionally or alternatively be used in other suitable geothermal energy transfer systems. The tubular 701 can be positioned in a wellbore, such as the wellbores 101, 203, or 205, and can carry or otherwise allow fluid to be transferred between components of the system. For example, the tubular 701 can transport the fluid between an energy transfer device 102 and the wellbore 101.

As illustrated in the sectional side-view 700a, the tubular 701 can carry fluid 716 in zone 706a. In some examples, the zone 706a can include a volume or area around the valve 702 or the tubular 701, within the tubular 701 (e.g., between the tubular 701 and the casing), or other suitable volumes or areas. The zone 706a can be characterized by a temperature that is above an upper threshold value. The upper threshold value can be a temperature above which fluid may cause corrosion and hence is not economically viable to absorb geothermal energy due to the cost of corrosion inhibitors, scale inhibitors, etc. Accordingly, the valve 702 may not actuate to open the port 704 or otherwise allow the fluid 716 to pass through a wall (e.g., the port 704) of the tubular 701, and the fluid 716 may be directed further downhole, or in other suitable directions such as to other portions of the zone 706*a* or to other suitable zones. Flow of fluid from the tubular 701 into the zone 706*a* or from outside of the wellbore to the inside of a return path (e.g. 103*b*) can be controlled in which the fluid can be injected, produced, or a combination thereof.

As illustrated in the sectional side-view 700*b*, the tubular 701 can carry the fluid 716 in zone 706*b*. The zone 706*b* can be similar to the zone 706*a* but may instead be characterized by a temperature that is within a temperature range. The temperature range can include temperatures at which the zone 706*b* may provide an efficient amount of geothermal energy. The valve 702 may actuate to open the port 704 or otherwise allow the fluid 716 to pass through the wall of the tubular 701 into the zone 706*b* or from the zone 706*b* into a return line (e.g., 103*b*). In some examples, the fluid 716 can absorb geothermal energy while in the zone 706*b* or otherwise in the tubular 701 and can be directed to a return path via another one or more port(s) 704 for returning to the surface 104, for example in a closed-loop geothermal energy transfer system. In other examples, the port 704 can allow the fluid 716 to be injected into a geothermal formation, for example in an open-loop geothermal energy transfer system. For instance, the port 704 can actuate or otherwise open and allow a flow control device to inject the fluid 716 from the tubular 701 into the geothermal formation. Flow of fluid from the tubular 701 into the zone 706*b* or from outside of the wellbore to the inside of a return path (e.g. 103*b*) can be controlled in which the fluid can be injected, produced, or a combination thereof. In some examples, the port 704 can actuate or otherwise allow the fluid 716 (and fluids in the zone 706*b*) to pass through the wall of the tubular 701 from the zone 706*b*. Additionally, the fluid 716 can absorb geothermal energy while in the zone 706*b*.

As illustrated in the sectional side-view 700*c*, the tubular 701 can carry the fluid 716 to zone 706*c*. The zone 706*c* can be similar to the zones 706*a* or 706*b* but may instead be characterized by a temperature that is below a lower threshold value. The lower threshold value can be a temperature below which the zone 706*c* may not be considered ideal for containing geothermal energy. Accordingly, the valve 702 may not actuate to open the port 704 or otherwise allow the fluid 716 to pass through a wall of the tubular 701, and the fluid 716 may be directed further downhole (e.g., to a different zone), or in other suitable directions such as to other portions of the zone 706*c*. In some examples, the fluid 716 may simply pass by the port 704 to be directed to a different zone that may allow the fluid 716 to absorb more geothermal energy compared to if the port 704 actuated and allowed the fluid 716 to pass through the wall of the tubular 701 in the illustrated zone.

The sectional side-view 700*c* illustrates a temperature sensor 750, actuators 760, and a flow control valve (e.g., the valve 702) within the same tool. In some examples, the temperature sensor 750 (or sensors) may be separate from the flow control valve. As illustrated, the sensor 750 is positioned in a wall of the tubular 701, but the sensor 750 can be positioned in other suitable locations with respect to the tubular 701 or in other locations such as a different tubular or different wellbore, etc. If the temperature sensor 750 is located too close to the source of the temperature, the temperature sensor 750 may cause the fluid 716 to be directed to a zone that may not allow the fluid 716 to absorb an optimal amount of geothermal energy. For example, if the temperature sensor 750 is located too close to the port 704, false readings of temperature may be used. The false readings of temperature may cause the fluid 716 to be injected into the formation having a non-ideal temperature, which can cause the geothermal energy transfer system to become less efficient (e.g., excessive work for little geothermal energy production).

Accordingly, the temperature sensor 750 can be positioned at a distance away from the source of the temperature for allowing accurate readings to be detected or used. For example, the temperature sensor 750 can be located (e.g., via or using a control line, etc.) 10 feet (3.05 meters) from the flow control valve, 25 feet (7.62 meters) from the flow control valve, 100 feet (30.5 meters) from the flow control valve, or even further. In some examples, the flow control valve can be controlled by more than one sensor. In some examples, the sensors can include pressure sensors with the temperature sensors. The flow of fluid from the tubular 701 into the zone 706*c* or from outside of the wellbore to the inside of a return path (e.g. 103*b*) can be controlled in which the fluid can be injected, produced, or a combination thereof.

Figure 8:
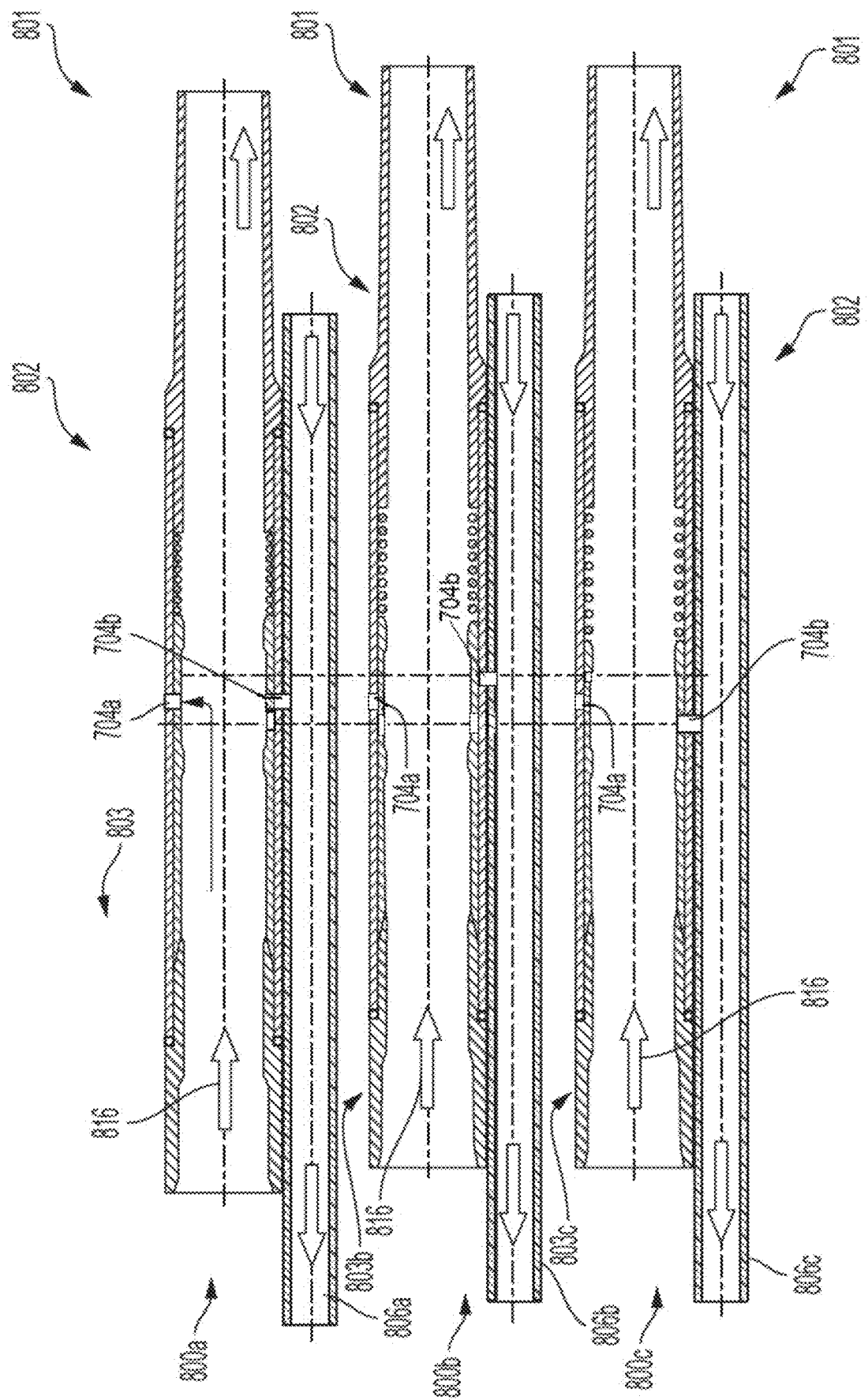
FIG. 8 is a set of sectional side-views of a tubular that includes a side-return line in a closed-loop geothermal energy transfer system according to one example of the present disclosure.

FIG. 8 is a set of sectional side-views 800*a-c* of a tubular 801 that includes valve 802 and a port 704 in a closed-loop geothermal energy transfer system according to one example of the present disclosure. In some examples, the valve 802 can additionally or alternatively be used in open-loop or combination geothermal energy transfer systems. The port 704 can be positioned, or otherwise disposed, in a wall of the tubular 801. In some examples, the valve 802 can actuate (e.g., using actuators, springs, sliding valves, etc.) to open or close the ports 704*a* and/or 704*b*. The port 704 can be positioned in other suitable locations with respect to the tubular 801 in which the port 704 may not obstruct flow within the tubular 801. In some examples, the tubular 801 can be a side-pocket mandrel that can be used in a geothermal energy transfer system, such as the geothermal energy transfer system 100 described with respect to FIG. 1. The tubular 801 can additionally or alternatively be used in other suitable geothermal energy transfer systems. The tubular 801 can be positioned in a wellbore, such as the wellbore 101, and can carry or otherwise allow fluid to be transferred between components of the system. For example, the tubular 801 can transport the fluid between an energy transfer device 102 and the wellbore 101.

As illustrated in the sectional side-view 800*a*, the tubular 801 can carry fluid 816 in zone 803*a*. In some examples, the zone 803*a* can include a volume or area around the tubular 801. The zone 803*a* can be characterized by a temperature that is within a temperature range (or other characteristic range such as PV value (pressure-temperature)). The temperature range can include temperatures at which the fluid 816 in the zone 803*a* may efficiently provide an efficient amount of geothermal energy. Accordingly, the valve 802 may actuate to open the port 704*a* or otherwise allow the fluid 816 to pass through a wall of the tubular 801 into the zone 803*a* while leaving port 704*b* closed. In some examples, the port 704*b* can be opened to allow fluid into return path 806*a* that can return the fluid 816 to the surface 104 for transferring geothermal energy from the fluid 816 into usable energy. The flow of fluid from the tubular 801 into the zone 803*a* or from outside of the wellbore to the inside of a return path (e.g. 103*b* or 806*a*) can be controlled in which the fluid can be injected, produced, or a combination thereof. In some examples, the fluid 816 can be directed further down the tubular 801 to a zone characterized by a more ideal temperature for absorbing geothermal energy.

As illustrated in the sectional side-view 800*b*, the tubular 801 can carry the fluid 816 in zone 803*b*. In some examples, the zone 803*b* can include a volume or area around the tubular 801. The zone 803*b* can be characterized by a temperature that is within a low temperature range. The valve 802 may not actuate to open the ports 704*a-b* or may otherwise prevent the fluid 816 from passing through the wall of the tubular 801 or the valve 802 and into the zone 803*b* or into return line 806*b*. In some examples, the fluid 816 can be directed further down the tubular 801 to a zone of higher temperature.

As illustrated in the sectional side-view 800*c*, the tubular 801 can carry the fluid 816 in zone 803*c*. In some examples, the zone 803*c* can include a volume or area around the tubular 801 or the valve 802. The zone 803*c* can be characterized by a temperature that is above a higher threshold value. Accordingly, the valve 802 may not actuate to open the port 704*a* or may not otherwise allow the fluid 816 to pass through a wall of the tubular 801 into the geothermal formation (e.g., the zone 803*c*). The flow of fluid from outside of the wellbore to the inside of a return path (e.g. 103*b*) can be controlled in which the fluid can be prevented from being produced. In some examples, the valve 802 can actuate to open the port 704*b* or otherwise allow the fluid 816 to be directed into return path 806*c* if the return path 806*c* is characterized by a temperature above an upper threshold (e.g., above a predetermined temperature in which directing the fluid 816 further along the tubular 801 would result in no additional geothermal energy gain, etc.). In other examples, the fluid 816 can be directed further down the tubular 801 to a zone characterized by a more ideal temperature for absorbing geothermal energy.

Figure 9:
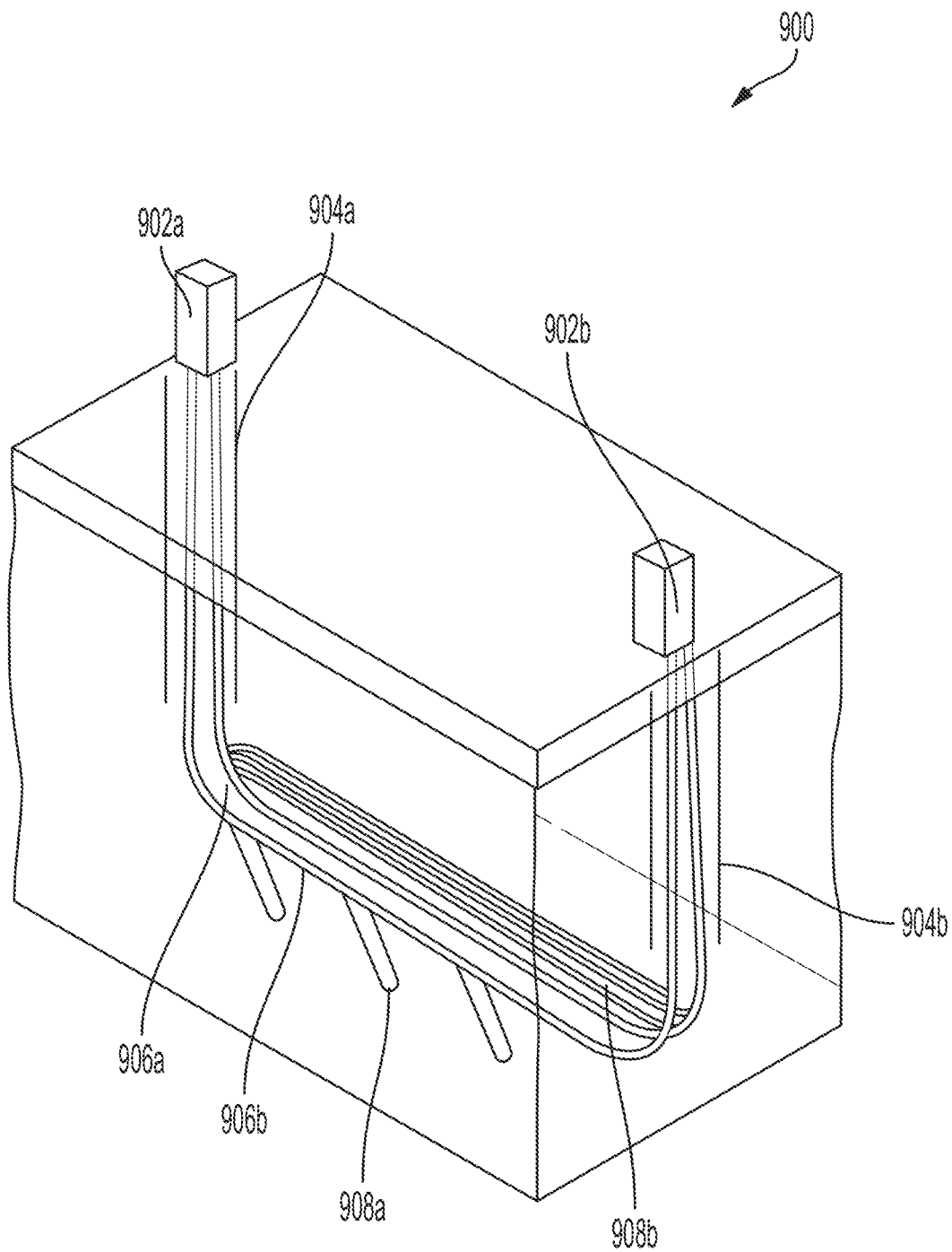
FIG. 9 is a perspective view of a geothermal energy transfer system that includes two surface locations according to one example of the present disclosure.

FIG. 9 is a perspective view of a geothermal energy transfer system 900 that includes two surface locations 902*a-b* according to one example of the present disclosure. The surface locations 902*a-b* can include one or more energy transfer devices such as the energy transfer device 102. In some examples, each surface location 902*a-b* can include an energy transfer device. Additionally, wellbores 904*a-b* can be formed proximate to the surface locations 902*a-b*, respectively. For example, the wellbore 904*a* can be formed adjacent or otherwise proximate to the surface location 902*a*, and the wellbore 904*b* can be formed adjacent or otherwise proximate to the surface location 902*b*.

The geothermal energy transfer system 900 can include tubulars 906*a-b*. The tubulars 906 can communicatively, operably, mechanically, or otherwise suitably couple the surface locations 902*a-b*. For example, the tubular 906*a* can extend from the surface location 902*b* to the surface location 902*a*, and the tubular 906*b* can extend from the surface location 902*a* to the surface location 902*b*. The geothermal energy transfer system 900 can additionally include lateral, or otherwise subsidiary, tubulars 908*a-b*. The subsidiary tubulars 908*a-b* can respectively extend from the tubulars 906*a-b* into a geothermal formation, and, in some examples, back into the tubulars 906*a-b*, respectively. Additionally or alternatively, the subsidiary tubulars 908*a-b* can be or can include lateral wellbores (e.g., the lateral wellbores 302*a-c* described with respect to FIG. 3).

The geothermal energy transfer system 900 can inject fluid into the geothermal formation from the surface location 902*a*, the surface location 902*b*, or a combination thereof. In some examples, the geothermal energy transfer system 900 can simultaneously inject the fluid from the surface locations 902*a-b*. The geothermal energy transfer system 900 can operate as a closed-loop system, in which the fluid absorbs geothermal energy while positioned in the tubulars 906, while positioned in the wellbores 904*a-b*, within the confines of a "zone." According to this invention, the geothermal energy transfer system 900 can operate as an open-loop system, in which the fluid can be injected from the tubulars 906 into and produced from the geothermal formation, or a combination thereof. The fluid can be produced from the tubulars 906 from the surface location 902 opposite the surface location 902 from which the fluid was injected. For example, if the fluid was injected into the tubular 906*b* from the surface location 902*a*, then the fluid can be produced from the tubular 906*b* by the surface location 902*b*.

In some examples, the geothermal energy transfer system 900 can be an open-loop system or a combination system. For example, fluid can be injected into one wellbore (e.g., the wellbore 904*a*), can be passed through the formation to absorb geothermal energy, and can be produced by a second wellbore (e.g., the wellbore 904*b*). Alternative to the formation, the fluid can be passed into a zone of one of the wellbores 904*a-b* or into one or more lateral tubulars 908*a-b* to absorb geothermal energy. The flow of the fluid can be controlled by one or more valves, sensors, controllers, isolation devices, etc.

In some examples, the geothermal energy transfer system 900 can include one or more wellbore systems or subsystems. For example, The geothermal energy transfer system 900 can include a first subsystem that includes the tubular 906*a* between the surface locations 902*a-b*. A second subsystem can include the tubular 906*b* between the surface locations 902*a-b*. A third subsystem can include the surface location 902*a*, the tubular 906*a*, and the tubular 906*b* (in which fluid is injected and produced from the surface location 902*a*). A fourth subsystem can include the surface location 902*b*, the tubular 906*a*, and the tubular 906*b* (in which fluid is injected and produced from the surface location 902*b*). Other systems or subsystems of the geothermal energy transfer system 900 are possible.

In some aspects, systems and methods for isolation devices and flow control device positionable in a wellbore for controlling fluid flow for geothermal energy transfer are provided according to one or more of the following examples.

As used below, any reference to a series of examples is to be understood as a reference to each of those examples disjunctively (e.g., "Examples 1-4" is to be understood as "Examples 1, 2, 3, or 4").

Example 1 is a system comprising: a plurality of isolation devices positionable between a wall of a wellbore and a tubular that is positionable in the wellbore for carrying fluid for geothermal energy transfer; a flow control device positionable in the wellbore and positionable between the plurality of isolation devices for controlling flow of the fluid between zones of the wellbore for transferring geothermal energy to a surface of the wellbore; and an energy transfer device positionable at the surface of the wellbore for transferring the geothermal energy from the fluid to usable energy.

Example 2 is the system of example 1, further comprising: a plurality of valves positionable between the plurality of isolation devices in the wellbore; and at least one sensor positionable in the wellbore and communicatively couplable to the flow control device, wherein a temperature of the fluid and a pressure of the fluid is detectable by the at least one sensor, and wherein: the tubular includes an injection path that extends from the energy transfer device to the wellbore and a return path that extends from the wellbore to the energy transfer device; the fluid is injectable into the wellbore via the injection path; the fluid is transportable by the flow control device using the plurality of valves to a temperature zone of a wellbore for absorbing geothermal energy from a geothermal formation; and the fluid is extractable from a wellbore via the return path from the temperature zone for transferring the geothermal energy from the fluid to the usable energy.

Example 3 is the system of example 1, wherein the wellbore is a first wellbore, the plurality of isolation devices is a first plurality of isolation devices, the tubular is a first tubular, and the flow control device is a first flow control device, further comprising: a second plurality of isolation devices positionable between a wall of a second wellbore and a second tubular that is positionable in the second wellbore; a second flow control device positionable in the second wellbore and positionable between the second plurality of isolation devices; a first plurality of valves positionable between the first plurality of isolation devices; a second plurality of valves positionable between the second plurality of isolation devices, wherein: the second wellbore is formed proximate to the first wellbore and within a geothermal formation; the fluid is injectable into the first wellbore via the first tubular, which is an injection path of the fluid that extends from the energy transfer device to the first wellbore; the fluid is extractable from the second wellbore via the second tubular, which is a return path of the fluid that extends from the second wellbore to the energy transfer device; the first plurality of valves are controllable to allow injection of the fluid from the first tubular into a temperature zone of the geothermal formation for absorbing the geothermal energy; and the second plurality of valves are controllable to allow extraction of the fluid having at least a threshold temperature from the geothermal formation into the second tubular for transporting the fluid to the energy transfer device.

Example 4 is the system of any of examples 1 and 3, further comprising a third tubular positionable in the first wellbore for providing a return path of the fluid in the first wellbore, wherein the third tubular extends from the first wellbore to the energy transfer device, wherein the first plurality of valves are controllable by the flow control device for performing: directing the fluid into a temperature zone of the geothermal formation for absorbing the geothermal energy and for being extracted by the second wellbore and returned to the energy transfer device via the second tubular in an open-loop configuration; and directing the fluid into a temperature zone of the first wellbore for absorbing the geothermal energy and returning to the energy transfer device via the third tubular in a closed-loop configuration.

Example 5 is the system of example 1, wherein the flow control device includes a thermostatically controlled flow control device, or an autonomous flow control device, and wherein the autonomous flow control device includes a hybrid autonomous flow control device, a fluidic diode, or a rate-control valve.

Example 6 is the system of example 1, wherein the flow control device is controllable autonomously based on a temperature of the fluid.

Example 7 is the system of any of examples 1 and 6, further comprising a plurality of valves positionable within the wellbore, wherein the wellbore is formed in a fractured geothermal formation, wherein the fluid is injectable into the fractured geothermal formation from a minimum temperature zone of the wellbore via a first subset of the plurality of valves using the flow control device for allowing the fluid to absorb geothermal energy, and wherein the fluid is extractable from the fractured geothermal formation into a second zone of the wellbore via a second subset of the plurality of valves using the flow control device.

Example 8 is the system of example 1, wherein the plurality of isolation devices are positionable between an injection path of the fluid and a return path of the fluid.

Example 9 is the system of example 1, further comprising: a plurality of valves, which correspond to a plurality of lateral wellbores that extend from the wellbore into a geothermal formation, for controlling flow of the fluid into each lateral wellbore of the plurality of lateral wellbores, wherein the plurality of valves is usable by the flow control device for performing one of: directing the fluid to a first lateral wellbore of the plurality of lateral wellbores for injecting the fluid into the geothermal formation and for extracting the fluid from the geothermal formation into a second lateral wellbore of the plurality of lateral wellbores to transfer the fluid to the surface; or directing the fluid to the first lateral wellbore of the plurality of lateral wellbores for absorbing the geothermal energy and retrieving the fluid from the first lateral wellbore for transferring the fluid to the surface, wherein the first lateral wellbore is characterized by a temperature with respect to the plurality of lateral wellbores.

Example 10 is a method comprising: injecting fluid into a tubular of a wellbore formed in a geothermal formation for allowing the fluid to absorb geothermal energy, the wellbore including: a plurality of isolation devices positioned between a wall of the wellbore and the tubular to define zones in the wellbore; and a flow control device positioned in the wellbore and between the plurality of isolation devices for controlling flow of the fluid between the zones of the wellbore; directing the fluid, using the flow control device, between zones of the wellbore; extracting the fluid from a zone of the wellbore via the tubular of the wellbore; and generating usable energy with the fluid using an energy transfer device positioned at a surface of the wellbore.

Example 11 is the method of example 10, wherein: directing the fluid, using the flow control device, between zones of the wellbore includes transporting, via the flow control device using sensors that detect temperature and pressure of the fluid, the fluid to a temperature zone of the wellbore using a plurality of valves positioned between the plurality of isolation devices; injecting the fluid into the tubular of the wellbore includes injecting the fluid into an injection path of the tubular that extends from the energy transfer device to the wellbore; and extracting the fluid from the zone of the wellbore via the tubular of the wellbore includes extracting the fluid from a return path of the tubular that extends from the wellbore to the energy transfer device.

Example 12 is the method of example 10, wherein: the wellbore is a first wellbore, the plurality of isolation devices is a first plurality of isolation devices, and the flow control device is a first flow control device; transporting, via the flow control device, the fluid to a temperature zone of the wellbore using a plurality of valves includes selectively injecting the fluid into the geothermal formation from the temperature zone of the wellbore using a first plurality of valves; and extracting the fluid from a zone of the wellbore via the tubular of the wellbore includes selectively extracting the fluid from the geothermal formation via a tubular of a second wellbore using a second plurality of valves positioned between a second plurality of isolation devices that are positioned in the second wellbore and around a second flow control device.

Example 13 is the method of any of examples 10 and 12, wherein: injecting the fluid into the tubular of the first wellbore includes directing the fluid into a temperature zone of the geothermal formation for absorbing the geothermal energy and for being extracted by the second wellbore and returned to the energy transfer device via the tubular of the second wellbore in an open-loop configuration; or injecting the fluid into the tubular of the first wellbore includes directing the fluid into a temperature zone of the first wellbore for absorbing the geothermal energy and returning to the energy transfer device via a third tubular in a closed-loop configuration, the third tubular positioned in the first wellbore for providing a return path for the fluid from the first wellbore to the energy transfer device.

Example 14 is the method of example 10, wherein: the wellbore is formed in a fractured geothermal formation; injecting the fluid into the tubular of the wellbore includes injecting, via the flow control device using a first valve positioned in a minimum temperature zone of the wellbore, the fluid into the fractured geothermal formation from the minimum temperature zone of the wellbore; and extracting the fluid from a zone of the wellbore via the tubular of the wellbore includes extracting, via the flow control device using a second valve positioned in a second zone of the wellbore that is different than the minimum temperature zone of the wellbore, the fluid from the fractured geothermal formation into the second zone of the wellbore for transferring the fluid to the surface.

Example 15 is the method of example 10, wherein the flow control device includes a thermostatically controlled flow control device, or an autonomous flow control device, wherein the autonomous flow control device includes a hybrid autonomous flow control device, a fluidic diode, or a rate-control valve, and wherein the flow control device is controllable autonomously based on a temperature of the fluid.

Example 16 is a flow control device comprising: an entrance housing defining a path for receiving fluid that is injected into a wellbore for absorbing geothermal energy; and an exit housing defining a path for selectively transporting fluid to a zone of a plurality of zones of the wellbore, the plurality of zones formed by a plurality of isolation devices that are positionable around the flow control device and in the wellbore between a wall of the wellbore and a tubular that is positionable in the wellbore for carrying the fluid to an energy transfer device positionable at a surface of the wellbore for transferring the geothermal energy into usable energy.

Example 17 is the flow control device of example 16, wherein the fluid is receivable by the entrance housing from an injection path of the tubular, and wherein the exit housing is usable to transport the fluid to a temperature zone of the wellbore.

Example 18 is the flow control device of example 16, wherein the wellbore is a first wellbore that is formed in a geothermal formation, wherein the fluid is receivable by the entrance housing from an injection path of the tubular, and wherein the exit housing is usable to inject the fluid into the geothermal formation for absorbing geothermal energy and for being produced by a second wellbore formed in the geothermal formation and proximate to the first wellbore.

Example 19 is the flow control device of example 16, wherein flow of the fluid into the entrance housing and flow of the fluid out of the exit housing is controllable autonomously based on a temperature of the fluid.

Example 20 is the flow control device of example 16, wherein the flow control device is controllable by temperature or autonomously.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a plurality of isolation devices positionable between a wall of a wellbore and a tubular that is positionable in the wellbore for carrying fluid for geothermal energy transfer, the wellbore positioned in a geothermal formation;
   a flow control device positionable in the wellbore and positionable between the plurality of isolation devices for controlling flow of the fluid between one or more zones of the wellbore;
   a temperature sensor coupled with the flow control device, the temperature sensor positionable in the wellbore to provide temperature measurements for the flow control device, flow of the fluid controllable between the wellbore and the geothermal formation for transferring geothermal energy to a surface of the wellbore, each zone of the one or more zones having a different potential for generating geothermal energy, wherein the temperature measurements are usable by the flow control device to identify a particular zone of the one or more zones having the highest potential for generating geothermal energy, the flow control device usable to selectively transport the fluid to the particular zone of the one or more zones; and
   an energy transfer device positionable at the surface of the wellbore for transferring the geothermal energy from the fluid to usable energy.

2. The system of claim 1, further comprising:
   a plurality of valves positionable between the plurality of isolation devices in the wellbore, wherein:
      the tubular includes an injection path that extends from the energy transfer device to the wellbore and a return path that extends from the wellbore to the energy transfer device;
      the fluid is injectable into the wellbore via the injection path;
      the fluid is transportable by the flow control device using the plurality of valves to a temperature zone of a wellbore for absorbing geothermal energy from a geothermal formation; and
      the fluid is extractable from a wellbore via the return path from the temperature zone for transferring the geothermal energy from the fluid to the usable energy.

3. The system of claim 1, wherein the wellbore is a first wellbore, the plurality of isolation devices is a first plurality of isolation devices, the tubular is a first tubular, and the flow control device is a first flow control device, further comprising:
   a second plurality of isolation devices positionable between a wall of a second wellbore and a second tubular that is positionable in the second wellbore;
   a second flow control device positionable in the second wellbore and positionable between the second plurality of isolation devices;

a first plurality of valves positionable between the first plurality of isolation devices;
a second plurality of valves positionable between the second plurality of isolation devices, wherein:
the second wellbore is formed proximate to the first wellbore and within a geothermal formation;
the fluid is injectable into the first wellbore via the first tubular, which is an injection path of the fluid that extends from the energy transfer device to the first wellbore;
the fluid is extractable from the second wellbore via the second tubular, which is a return path of the fluid that extends from the second wellbore to the energy transfer device;
the first plurality of valves are controllable to allow injection of the fluid from the first tubular into a temperature zone of the geothermal formation for absorbing the geothermal energy; and
the second plurality of valves are controllable to allow extraction of the fluid having at least a threshold temperature from the geothermal formation into the second tubular for transporting the fluid to the energy transfer device.

4. The system of claim 3, further comprising a third tubular positionable in the first wellbore for providing a return path of the fluid in the first wellbore, wherein the third tubular extends from the first wellbore to the energy transfer device, wherein the first plurality of valves are controllable by the flow control device for performing:
directing the fluid into a temperature zone of the geothermal formation for absorbing the geothermal energy and for being extracted by the second wellbore and returned to the energy transfer device via the second tubular in an open-loop configuration; and
directing the fluid into a temperature zone of the first wellbore for absorbing the geothermal energy and returning to the energy transfer device via the third tubular in a closed-loop configuration.

5. The system of claim 1, wherein the flow control device includes a thermostatically controlled flow control device, or an autonomous flow control device, and wherein the autonomous flow control device includes a hybrid autonomous flow control device, a fluidic diode, or a rate-control valve.

6. The system of claim 1, wherein the flow control device is controllable autonomously based on a temperature of the fluid.

7. The system of claim 6, further comprising a plurality of valves positionable within the wellbore, wherein the wellbore is formed in a fractured geothermal formation, wherein the fluid is injectable into the fractured geothermal formation from a minimum temperature zone of the wellbore via a first subset of the plurality of valves using the flow control device for allowing the fluid to absorb geothermal energy, and wherein the fluid is extractable from the fractured geothermal formation into a second zone of the wellbore via a second subset of the plurality of valves using the flow control device.

8. The system of claim 1, wherein the plurality of isolation devices are positionable between an injection path of the fluid and a return path of the fluid.

9. The system of claim 1, further comprising:
a plurality of valves, which correspond to a plurality of lateral wellbores that extend from the wellbore into a geothermal formation, for controlling flow of the fluid into each lateral wellbore of the plurality of lateral wellbores, wherein the plurality of valves is usable by the flow control device for performing one of:
directing the fluid to a first lateral wellbore of the plurality of lateral wellbores for injecting the fluid into the geothermal formation and for extracting the fluid from the geothermal formation into a second lateral wellbore of the plurality of lateral wellbores to transfer the fluid to the surface; or
directing the fluid to the first lateral wellbore of the plurality of lateral wellbores for absorbing the geothermal energy and retrieving the fluid from the first lateral wellbore for transferring the fluid to the surface, wherein the first lateral wellbore is characterized by a temperature with respect to the plurality of lateral wellbores.

10. A method comprising:
injecting fluid into a tubular of a wellbore formed in a geothermal formation for allowing the fluid to absorb geothermal energy, the wellbore including:
a plurality of isolation devices positioned between a wall of the wellbore and the tubular to define one or more zones in the wellbore; and
a flow control device positioned in the wellbore and between the plurality of isolation devices for controlling flow of the fluid between the one or more zones of the wellbore and for controlling flow of the fluid between the wellbore and the geothermal formation;
a temperature sensor coupled with the flow control device, the temperature sensor positionable in the wellbore to provide temperature measurements for the flow control device, each zone of the one or more zones having a different potential for generating geothermal energy, wherein the temperature measurements are usable by the flow control device to identify a particular zone of the one or more zones having the highest potential for generating geothermal energy, the flow control device usable to selectively transport the fluid to a particular zone of the one or more zones with the highest potential for generating geothermal energy;
directing, based on the temperature measurements and using the flow control device, the fluid between zones of the wellbore;
extracting the fluid from a zone of the wellbore via the tubular of the wellbore; and
generating usable energy with the fluid using an energy transfer device positioned at a surface of the wellbore.

11. The method of claim 10, wherein:
injecting the fluid into the tubular of the wellbore includes injecting the fluid into an injection path of the tubular that extends from the energy transfer device to the wellbore; and
extracting the fluid from the zone of the wellbore via the tubular of the wellbore includes extracting the fluid from a return path of the tubular that extends from the wellbore to the energy transfer device.

12. The method of claim 10, wherein:
the wellbore is a first wellbore, the plurality of isolation devices is a first plurality of isolation devices, and the flow control device is a first flow control device;
transporting, via the flow control device, the fluid to a temperature zone of the wellbore using a plurality of valves includes selectively injecting the fluid into the geothermal formation from the temperature zone of the wellbore using a first plurality of valves; and
extracting the fluid from a zone of the wellbore via the tubular of the wellbore includes selectively extracting the fluid from the geothermal formation via a tubular of a second wellbore using a second plurality of valves positioned between a second plurality of isolation devices that are positioned in the second wellbore and around a second flow control device.

13. The method of claim 12, wherein:
injecting the fluid into the tubular of the first wellbore includes directing the fluid into a temperature zone of the geothermal formation for absorbing the geothermal energy and for being extracted by the second wellbore and returned to the energy transfer device via the tubular of the second wellbore in an open-loop configuration; or
injecting the fluid into the tubular of the first wellbore includes directing the fluid into a temperature zone of the first wellbore for absorbing the geothermal energy and returning to the energy transfer device via a third tubular in a closed-loop configuration, the third tubular positioned in the first wellbore for providing a return path for the fluid from the first wellbore to the energy transfer device.

14. The method of claim 10, wherein:
the wellbore is formed in a fractured geothermal formation;
injecting the fluid into the tubular of the wellbore includes injecting, via the flow control device using a first valve positioned in a minimum temperature zone of the wellbore, the fluid into the fractured geothermal formation from the minimum temperature zone of the wellbore; and
extracting the fluid from a zone of the wellbore via the tubular of the wellbore includes extracting, via the flow control device using a second valve positioned in a second zone of the wellbore that is different than the minimum temperature zone of the wellbore, the fluid from the fractured geothermal formation into the second zone of the wellbore for transferring the fluid to the surface.

15. The method of claim 10, wherein the flow control device includes a thermostatically controlled flow control device, or an autonomous flow control device, wherein the autonomous flow control device includes a hybrid autonomous flow control device, a fluidic diode, or a rate-control valve, and wherein the flow control device is controllable autonomously based on a temperature of the fluid.

16. A flow control device comprising:
an entrance housing defining a path for receiving fluid that is injected into a wellbore for absorbing geothermal energy, the wellbore positioned in a geothermal formation; and
an exit housing defining a path for selectively transporting fluid to a zone of a plurality of zones formed by a plurality of isolation devices that are positionable around the flow control device and in the wellbore between a wall of the wellbore and a tubular that is positionable in the wellbore for carrying the fluid to an energy transfer device positionable at a surface of the wellbore for transferring the geothermal energy into usable energy, the plurality of zones corresponding to one or more zones in the wellbore and in the geothermal formation, the flow control device coupled with a temperature sensor positionable in the wellbore to provide temperature measurements for the flow control device, each zone of the one or more zones having a different potential for generating geothermal energy, the temperature sensor usable by the flow control device to identify a particular zone of the one or more zones having the highest potential for generating geothermal energy, the flow control device usable to selectively transport the fluid to a particular zone of the one or more zones.

17. The flow control device of claim 16, wherein the fluid is receivable by the entrance housing from an injection path of the tubular, and wherein the exit housing is usable to transport the fluid to a temperature zone of the wellbore.

18. The flow control device of claim 16, wherein the wellbore is a first wellbore that is formed in a geothermal formation, wherein the fluid is receivable by the entrance housing from an injection path of the tubular, and wherein the exit housing is usable to inject the fluid into the geothermal formation for absorbing geothermal energy and for being produced by a second wellbore formed in the geothermal formation and proximate to the first wellbore.

19. The flow control device of claim 16, wherein flow of the fluid into the entrance housing and flow of the fluid out of the exit housing is controllable autonomously based on a temperature of the fluid.

20. The flow control device of claim 16, wherein the flow control device is controllable by temperature or autonomously.

* * * * *